(12) United States Patent
Xu et al.

(10) Patent No.: US 12,430,892 B2
(45) Date of Patent: Sep. 30, 2025

(54) DETECTING AN OBJECT IN AN IMAGE USING MULTIBAND AND MULTIDIRECTIONAL FILTERING

(71) Applicant: Tencent Technology (Shenzhen) Company Limited, Guangdong (CN)

(72) Inventors: Dong Xu, Shenzhen (CN); Guofei Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 402 days.

(21) Appl. No.: 17/982,101

(22) Filed: Nov. 7, 2022

(65) Prior Publication Data

US 2023/0053911 A1 Feb. 23, 2023

Related U.S. Application Data

(63) Continuation of application No. PCT/CN2022/070095, filed on Jan. 4, 2022.

(30) Foreign Application Priority Data

Jan. 12, 2021 (CN) .......................... 202110033937.9

(51) Int. Cl.
*G06V 10/774* (2022.01)
*G06V 10/80* (2022.01)

(52) U.S. Cl.
CPC .......... *G06V 10/774* (2022.01); *G06V 10/803* (2022.01); *G06V 10/806* (2022.01); *G06V 2201/07* (2022.01)

(58) Field of Classification Search
CPC .. G06V 10/774; G06V 10/803; G06V 10/806; G06V 10/30; G06V 2201/07;
(Continued)

(56) References Cited

U.S. PATENT DOCUMENTS

2020/0183002 A1 6/2020 Lee et al.

FOREIGN PATENT DOCUMENTS

| CN | 1588445 A | 3/2005 |
|---|---|---|
| CN | 102005037 A | 4/2011 |

(Continued)

OTHER PUBLICATIONS

Aydin et al, Use of M-band wavelet transform for multidirectional and multiscale edge detection 1994, IEEE International Conference on Acoustics, Speech and Signal Processing, pp. 1-5. (Year: 1994).*

(Continued)

*Primary Examiner* — Kathleen M Broughton
(74) *Attorney, Agent, or Firm* — ArentFox Schiff LLP

(57) ABSTRACT

A detection method includes performing multiband filtering on a first area to obtain a plurality of band sub-images, the first area being an area in a first video frame, and performing multidirectional filtering on the plurality of band sub-images to obtain a plurality of direction sub-images. The method further includes acquiring a direction-band fused feature of the first area according to the plurality of direction sub-images, and inputting the direction-band fused feature into a detection model, and performing detection based on the direction-band fused feature using the detection model to detect whether the first area comprises an object.

20 Claims, 11 Drawing Sheets

(58) Field of Classification Search
CPC ....... G06V 20/46; A63F 13/70; A63F 13/847; G06F 18/253
See application file for complete search history.

(56) References Cited

FOREIGN PATENT DOCUMENTS

| | | | |
|---|---|---|---|
| CN | 107783096 A | 3/2018 | |
| CN | 107832798 A | 3/2018 | |
| CN | 111666854 A | 9/2020 | |
| CN | 112699832 A | 4/2021 | |

OTHER PUBLICATIONS

Pillai et al, Camouflaged target detection using real-time video fusion algorithm based on multi-scale transforms, 2014, IEEE 27th Canadian Conference on Electrical and Computer Engineering, pp. 1-6. (Year: 2014).*

Ray et al, An Efficient Approach for Object Detection and Tracking of Objects in a Video with Variable Background, arXiv: 1706. 02672v1, pp. 1-11. (Year: 2017).*

Han et al, Background Subtraction Based on 3D Discrete Wavelet Transform, 2016, Sensors 16, 456; 1-20. (Year: 2016).*

Li et al, An Infrared and Visible Image Fusion Algorithm Based on LSWT-NSST, 2020, IEEE Digital Object Identifier, 8, 2020; 179857-179880. (Year: 2020).*

Arablouei, Fusing Multiple Multiband Images, 2018, Journal of Imaging, 4, 118, pp. 1-25 (Year: 2018).*

Hu et al, Multiscale directional bilateral filter and its application to multisensor image fusion, 2011, Information Fusion, 13, 2012, 196-206. (Year: 2011).*

International Search Report and Written Opinion issued in International Application No. PCT/CN2022/070095, mailed Mar. 9, 2022, with English Translation, 9 pages.

Zhang K, Zhang L, Yang M H. Real-time compressive tracking. In: Proc of European Conference on Computer Vision. Amsterdam: Springer, 2012, 864-877.

Zhan C, Duan X, Xu S, et al. An improved moving object detection algorithm based on frame difference and edge detection. In: Proc of 4th International Conference on Image and Graphics. Yantai: IEEE, 2007, 519-523.

Tian H, Ju Y, Wang P. Improved anti occlusion MeanShift tracking algorithm. In: Computer Engineering and Applications, 2016, 52 (6):197-203.

* cited by examiner

DETECTING AN OBJECT IN AN IMAGE USING MULTIBAND AND MULTIDIRECTIONAL FILTERING

RELATED APPLICATIONS

This application is a continuation of International Application No. PCT/CN2022/070095, entitled "TARGET DETECTION METHOD AND APPARATUS, AND DEVICE AND STORAGE MEDIUM," and filed on Jan. 4, 2022, which claims priority to Chinese Patent Application No. 202110033937.9, entitled "TARGET DETECTION METHOD, APPARATUS, AND DEVICE, AND STORAGE MEDIUM", and filed on Jan. 12, 2021. The entire disclosures of the prior applications are hereby incorporated by reference.

FIELD OF THE TECHNOLOGY

This application relates to the field of image recognition, including a target detection method, apparatus, and device, and a storage medium.

BACKGROUND OF THE DISCLOSURE

With the development of computer technology, more and more scenarios require target detection, such as identifying a moving game character in a game.

SUMMARY

Embodiments of this disclosure provide a detection method, apparatus, and device, and a storage medium, to improve detection accuracy.

In an embodiment, a detection method includes performing multiband filtering on a first area to obtain a plurality of band sub-images, the first area being an area in a first video frame, and performing multidirectional filtering on the plurality of band sub-images to obtain a plurality of direction sub-images. The method further includes acquiring a direction-band fused feature of the first area according to the plurality of direction sub-images, and inputting the direction-band fused feature into a detection model, and performing detection based on the direction-band fused feature using the detection model to detect whether the first area comprises an object.

In an embodiment, a detection apparatus includes processing circuitry configured to perform multiband filtering on a first area to obtain a plurality of band sub-images, the first area being an area in a first video frame, and perform multidirectional filtering on the plurality of band sub-images to obtain a plurality of direction sub-images. The processing circuitry is further configured to acquire a direction-band fused feature of the first area according to the plurality of direction sub-images, and input the direction-band fused feature into a detection model, and perform detection based on the direction-band fused feature using the detection model to detect whether the first area comprises an object.

In an embodiment, a non-transitory computer-readable storage medium stores computer-readable instructions thereon, which, when executed by a computer device, cause the computer device to perform a detection method. The detection method includes performing multiband filtering on a first area to obtain a plurality of band sub-images, the first area being an area in a first video frame, and performing multidirectional filtering on the plurality of band sub-images to obtain a plurality of direction sub-images. The method further includes acquiring a direction-band fused feature of the first area according to the plurality of direction sub-images, and inputting the direction-band fused feature into a detection model, and performing detection based on the direction-band fused feature using the detection model to detect whether the first area comprises an object.

BRIEF DESCRIPTION OF THE DRAWINGS

To describe the technical solutions in the embodiments of this disclosure more clearly, the following briefly introduces the accompanying drawings required for describing the embodiments. The accompanying drawings in the following description show merely some embodiments of this disclosure, and a person of ordinary skill in the art may still derive other drawings from these accompanying drawings.

DESCRIPTION OF EMBODIMENTS

Figure 1:
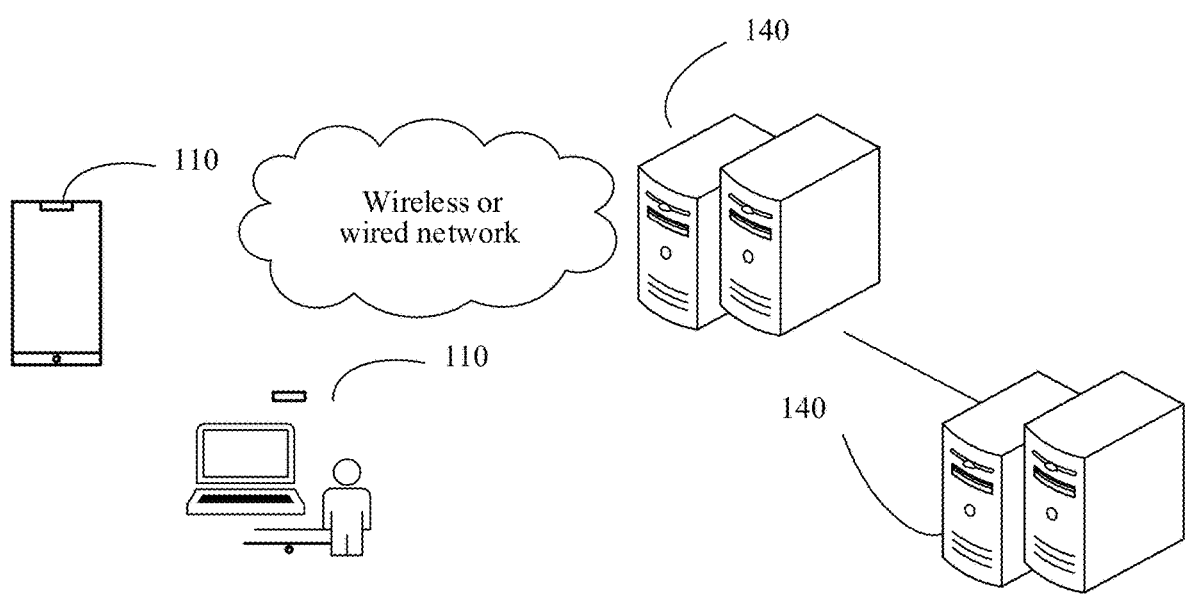
FIG. 1 is a schematic diagram of an implementation environment of a target detection method according to an embodiment of this disclosure.

To make the objectives, technical solutions, and advantages of this disclosure clearer, the following further describes the implementations of this disclosure in detail with reference to the accompanying drawings.

The terms "first", "second", and the like in this disclosure are used for distinguishing between same items or similar items of which effects and functions are basically the same. It is to be understood that, the "first", "second", and "nth" do not have a dependency relationship in logic or time sequence, and a quantity and an execution order thereof are not limited.

In the related art, a computer device determines the position of a moving target by a frame difference method, that is, a difference between two or more consecutive frames is taken to obtain a difference image. The difference between pixel values of the background is very small or even zero, and the difference between pixel values of the moving target is larger. Therefore, the computer device can detect the moving target by binarizing the obtained difference image.

However, when the moving target moves slowly or rotates, it may not be detected, and the overlap is not easily detected, causing the appearance of a hole. As a result, the detection accuracy is not high.

In this disclosure, the term "at least one" means one or more and "a plurality of" means two or more.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include fields such as a computer vision technology, a speech processing technology, a natural language processing technology, machine learning/deep learning, and the like.

ML is a multi-field interdiscipline, and relates to a plurality of disciplines such as the probability theory, statistics, the approximation theory, convex analysis, and the algorithm complexity theory. The ML specializes in studying how a computer simulates or implements a human learning behavior to obtain new knowledge or skills, and reorganize an existing knowledge submodel, so as to keep improving its performance. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

Normalization: a method of mapping sequences of numbers with different ranges to (0, 1) interval, which is convenient for data processing. In some cases, the normalized values can be directly realized as probabilities. Functions that can realize normalization include Softmax function and Sigmoid growth curve, and certainly also include other functions that can realize normalization, which are not limited in the embodiments of this disclosure.

FIG. 1 is a schematic diagram of an implementation environment of a target detection method according to an embodiment of this disclosure. Referring to FIG. 1, the implementation environment may include a terminal 110 and a server 140.

The terminal 110 is connected to the server 140 by using a wireless network or a wired network. In an embodiment, the terminal 110 is a smartphone, a tablet computer, a notebook computer, a desktop computer, a smartwatch, or the like, but is not limited thereto. An application that supports image display is installed and run on the terminal 110.

In an embodiment, the server is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

In an embodiment, the terminal 110 generally refers to one of a plurality of terminals. In the embodiments of this embodiment, the terminal 110 is merely used as an example for description.

A person skilled in the art may learn that there may be more or fewer terminals. For example, there may be only one terminal, or there may be dozens of or hundreds of or more terminals. In this case, another terminal may be further included in the foregoing application environment. The quantity and the device type of the terminals are not limited in the embodiments of this disclosure.

After introducing the implementation environment of the target detection method according to an embodiment of this disclosure, the application scenarios of the target detection method according to this embodiment of this disclosure will be described below.

1. The target detection method according to this embodiment of this disclosure can be applied to a scenario of detecting a game target, that is, during the game, the game target in a game scene can be detected and tracked by using the target detection method according to this embodiment of this disclosure.

Figure 2:
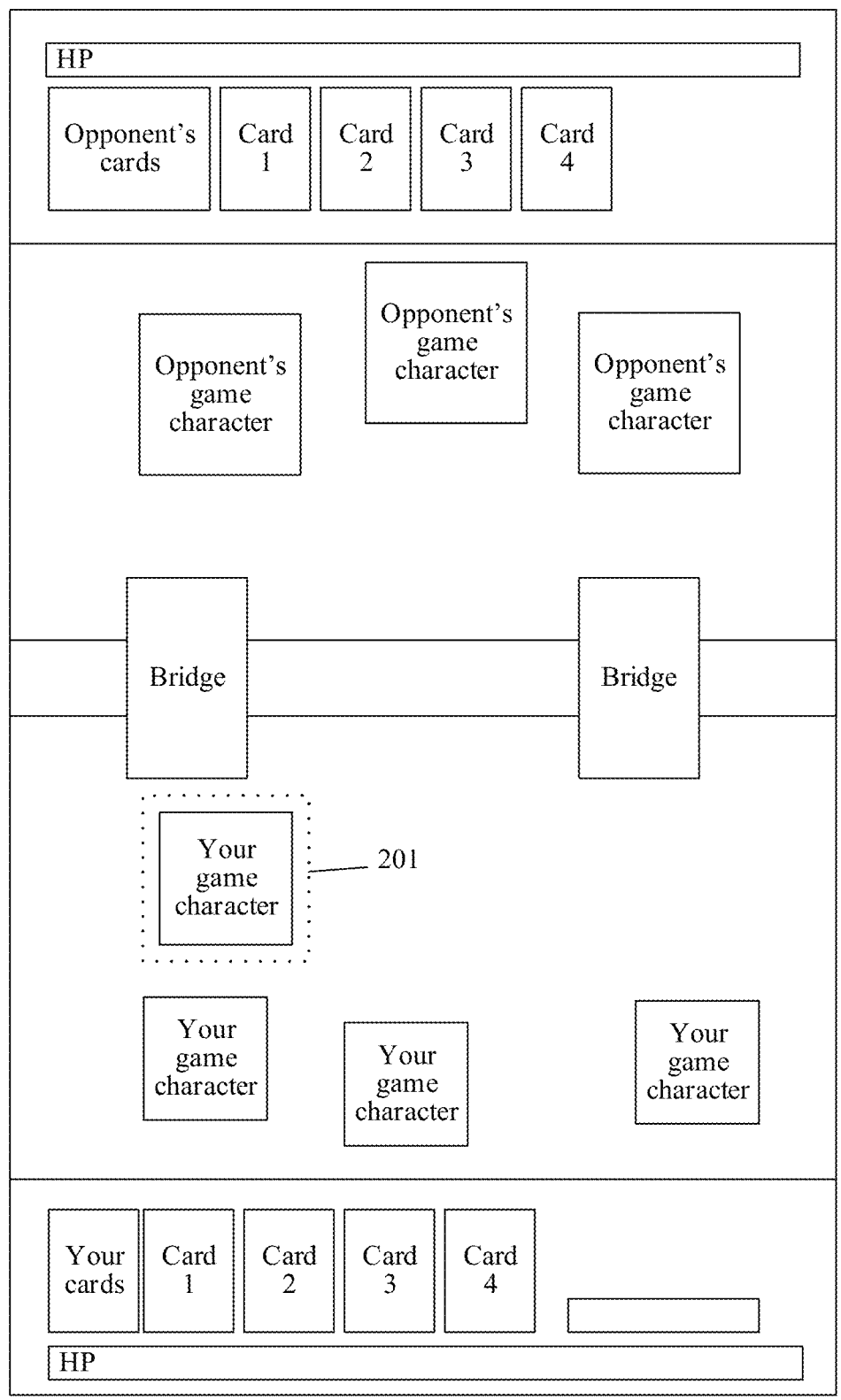
FIG. 2 is a schematic diagram of marking a game character in a game scene according to an embodiment of this disclosure.

Taking a card game as an example, in the card game, a player can release game characters corresponding to different cards in a game scene, and the game character can move or attack in the game scene. In the process of the game character moving in the game scene, the terminal can detect and track the moving game character by using the target detection method according to this embodiment of this disclosure so as to acquire coordinate information of the game character in real time and record the motion trajectory of the game character, so that technicians can analyze and test the game and find bugs in the game in time. An example of the terminal highlighting the game character is shown in FIG. 2. A marking box 201 of your game character is shown in FIG. 2.

Taking Multiplayer Online Battle Arena (MOBA) as an example, a player can control different game characters in the game scene, that is, control the game characters to move or cast virtual skills in the game scene. During the game, the terminal can detect and track the game character by using the target detection method according to this embodiment of this disclosure so as to acquire coordinate information of the game character and record the motion trajectory of the game character. With the aid of the motion trajectory of the game character, technicians cannot only analyze and test the game and find bugs in the game in time, but also generate a record of a single game, which at least stores the motion trajectory of the game character in this single game. In this case, the player can quickly review his own performance in this single game with the aid of the record of this single game without viewing the complete game record video, so that the human-machine interaction efficiency is improved.

Taking a turn-based game as an example, players on both sides can take turns to control the game characters to attack each other in the game scene, that is, only after the game character controlled by one player finishes attacking, can the game character controlled by the other player attack. During the game, the terminal can detect and track the game characters controlled by both of the players by using the target detection method according to this embodiment of this disclosure so as to acquire coordinate information of the game character in real time and record the motion trajectory of the game character. With the aid of the motion trajectory of the game character, technicians can analyze and test the game and eliminate some game abnormalities, such as abnormal disappearance of game characters or the case that the game character does not disappear after death. The technicians can quickly find the game abnormalities based on the motion trajectories of the game characters and repair the game abnormalities in time.

3. The target detection method according to this embodiment of this disclosure can be applied to a scenario of detecting and tracking a vehicle. That is, when the technicians need to track a target vehicle using an aerial video, the terminal can detect and track the target vehicle in the aerial video by using the target detection method according to this embodiment of this disclosure. In some embodiments, after using the target detection method according to this embodiment of this disclosure, the terminal can highlight the target vehicle in the aerial video, which is convenient for the technicians to track the vehicle.

The description of the above application scenarios is only for the convenience of understanding. In other possible implementations, the target detection method according to this embodiment of this disclosure may also be applied to scenarios of detecting other targets, for example, an animal or an aircraft, which is not limited in this embodiment of this disclosure.

In an embodiment of this disclosure, the technical solution according to this embodiment of this disclosure may be implemented by a server or a terminal as an execution subject, or through interaction between the terminal and the server, that is, the server makes data in the background and transmits processed data to the terminal, and the terminal displays the processing result to the user, which is not limited in this embodiment of this disclosure. The description will be made below by taking the execution subject being the terminal as an example.

Figure 3:
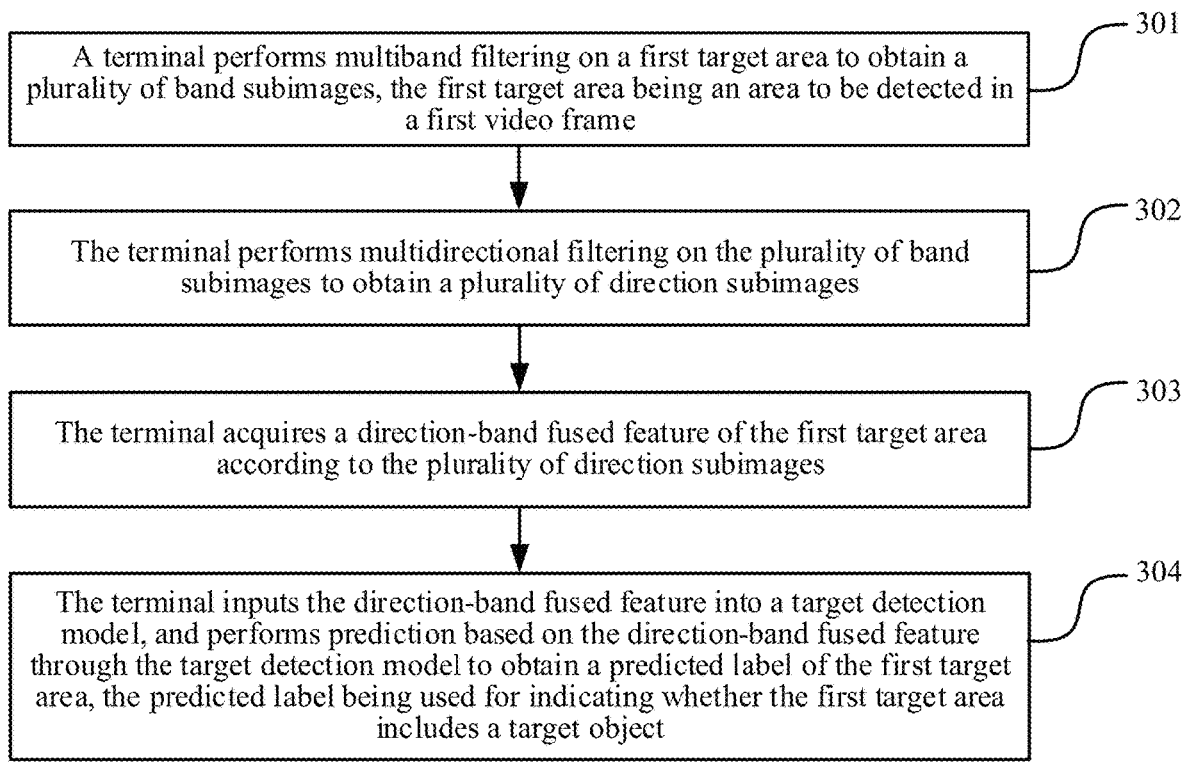
FIG. 3 is a flowchart of a target detection method according to an embodiment of this disclosure.

FIG. 3 is a flowchart of a target detection method according to an embodiment of this disclosure. Referring to FIG. 3, the method includes:

301: A terminal performs multiband filtering on a first target area to obtain a plurality of band subimages, the first target area being an area to be detected in a first video frame. For example, multiband filtering is performed on a first area to obtain a plurality of band sub-images, the first area being an area in a first video frame.

Band filtering is to perform filtering on the first target area using a specific frequency range. Correspondingly, multiband filtering is to perform filtering on the first target area using a plurality of frequency ranges. For example, if a frequency range (500, 800) exists, when filtering is performed on the first target area using the frequency range (500, 800), the part of the first target area within the frequency range (500, 800) is retained, and the part beyond the frequency range (500, 800) is deleted. The terminal decomposes the first target area into the plurality of band subimages through filtering through a plurality of bands, i.e., a plurality of frequency ranges. The band subimage is a filtered image having a frequency within the corresponding frequency range. In a case that the terminal performs filtering on the first target area using the frequency range (500, 800), the image obtained after filtering is a band subimage having a frequency within the frequency range (500, 800). In a case that the terminal performs filtering on the first target area using the frequency range (200, 300), the image obtained after filtering is a band subimage having a frequency within the frequency range (200, 300). In some embodiments, different band subimages are used for recording different image features.

302: The terminal performs multidirectional filtering on the plurality of band subimages to obtain a plurality of direction subimages. For example, multidirectional filtering is performed on the plurality of band sub-images to obtain a plurality of direction sub-images.

Directional filtering is to perform filtering on the band subimage using a specific direction. For example, in a case that four directions exist, if the due west is marked as 0°, then the due north is 90°, the due east is 180°, and the due south is 270°. Then, 0° to 90° is the first direction, 90° to 180° is the second direction, 180° to 270° is the third direction, and 270° to 360° (0°) is the fourth direction. Multidirectional filtering is to perform filtering on the band subimage using a plurality of directions, that is, a process of decomposing the band subimage into a plurality of direction subimages. Taking one band subimage as an example, in a case that the above four directions exist, after the terminal performs directional filtering on the band subimage, the band subimage is decomposed into direction subimages in the four directions. Correspondingly, N band subimages are decomposed into 4N direction subimages. N is a positive integer.

303: The terminal acquires a direction-band fused feature of the first target area according to the plurality of direction subimages. For example, a direction-band fused feature of the first area is acquired according to the plurality of direction sub-images.

Since the plurality of direction subimages are the plurality of direction subimages of the plurality of band subimages, the direction-band fused feature that fuses direction information and frequency information can be obtained according to the plurality of direction subimages.

304: The terminal inputs the direction-band fused feature into a target detection model, and performs prediction based on the direction-band fused feature through the target detection model to obtain a predicted label of the first target area, the predicted label being used for indicating whether the first target area includes a target object. For example, the direction-band fused feature is input into a detection model, and detection is performed based on the direction-band fused feature using the detection model to detect whether the first area comprises an object.

The target detection model is a model trained based on a sample video frame and a label corresponding to the sample video frame, and has the ability to identify the target object in the video frame. In some embodiments, the target detection model is Fast Region Convolutional Neural Networks (Faster R-CNN), Single Shot Multi Box Detector (SSD, real-time target detection), YOLO (You Only Look Once), a decision tree model, or Adaboost, etc., which is not limited in this embodiment of this disclosure.

By the aid of the technical solution according to this embodiment of this disclosure, the terminal can perform band filtering and directional filtering on the first target area in the first video frame to obtain the plurality of band subimages indicating band information of the first target area and the plurality of direction subimages indicating direction information of the first target area. The direction-band fused feature obtained by the terminal fusing the band information and the direction information can indicate features of the first target area more completely. Even if the target object moves slowly or rotates, the direction-band fused information can accurately indicate the features of the first target area. Subsequently, when the terminal performs target detection based on the direction-band fused feature through the target detection model, more accurate detection effects can be obtained.

Figure 4:
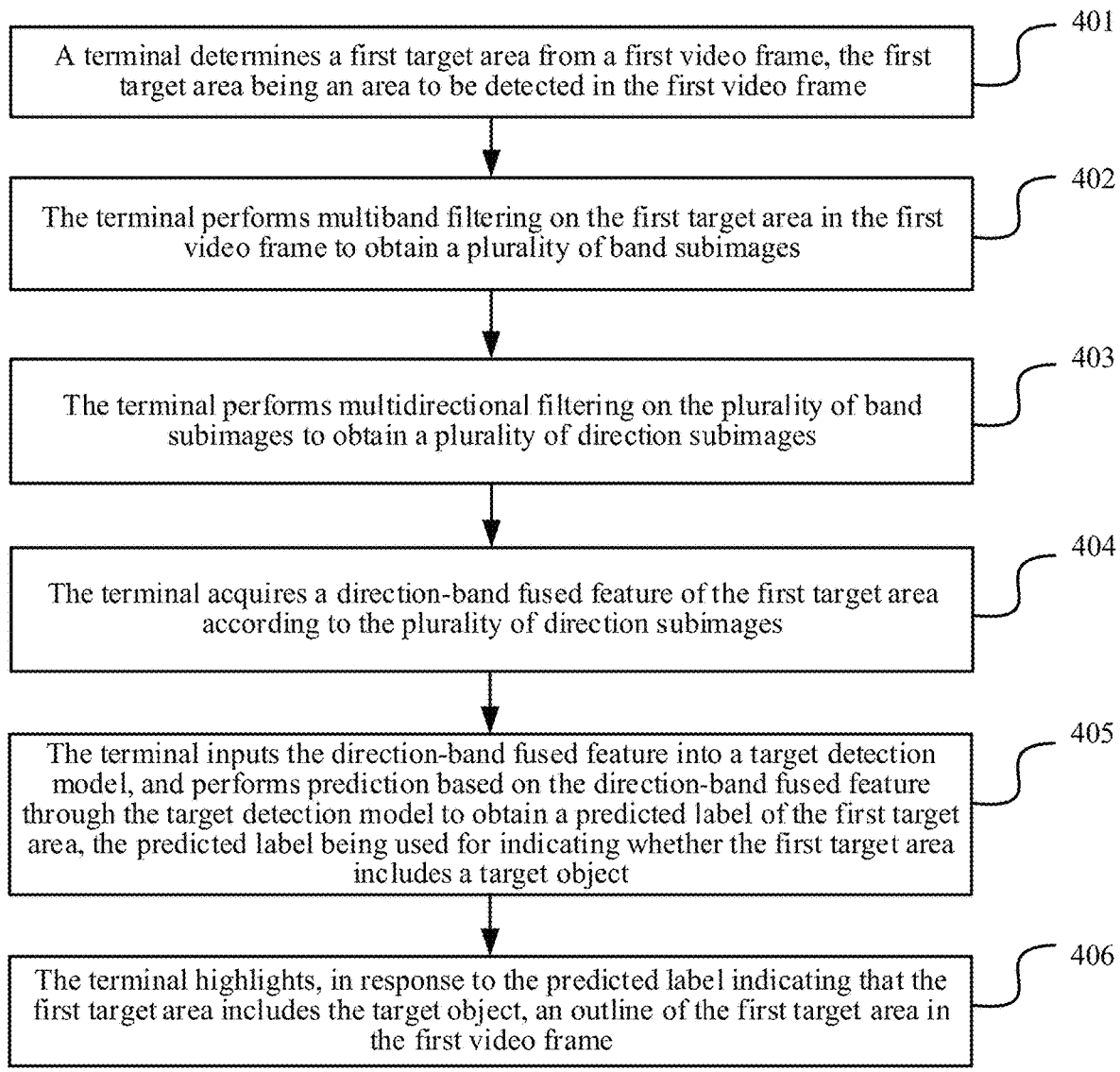
FIG. 4 is a flowchart of a target detection method according to an embodiment of this disclosure.

FIG. 4 is a flowchart of a target detection method according to an embodiment of this disclosure. Referring to FIG. 4, the method includes:

401: A terminal determines a first target area from a first video frame, the first target area being an area to be detected in the first video frame.

The first video frame is a video frame in a video containing a target object. The first target area is an area where the target object may exist. The target object is the target of the target detection method. In the game scene, the target object is the game character. In the scenario of detecting and tracking a character, the target object is the target character. In the scenario of detecting and tracking a vehicle, the target object is the target vehicle.

In a possible implementation, the terminal determines a second target area. The second target area is an area where the target object is located in a second video frame, and the second video frame is a video frame with a display time earlier than the first video frame. The terminal offsets the second target area based on the first video frame and the second video frame to obtain the first target area. The first target area is an area corresponding to the offset second target area in the first video frame.

In this implementation, since the video frames are consecutive and the first video frame and the second video frame are adjacent video frames in the same video frame, the positions of the target object in the adjacent video frames tend to be close to each other. After determining the second target area where the target object is located in the second video frame, the terminal offsets the second target area, and maps the offset second target area to the first video frame, so that the first target area can be obtained in the first video frame. The first target area is the area that may contain the target object.

The above implementation will be described below by way of two examples.

1. For example, the target object is a game character, and the display time of the second video frame is 1 s earlier than that of the first video frame. In a case that the terminal determines that center coordinates of the game character in the second video frame are (10, 15), the terminal can determine the second target area centered on the center coordinates (10, 15). In a case that the second target area is a square area with a side length of 4, coordinates of the bottom left corner of the second target area are (8, 13) and coordinates of the top right corner are (12, 17), the terminal can uniquely determine the second target area based on the coordinates of the bottom left corner and the coordinates of the top right corner. After the terminal offsets the second target area based on the first video frame and the second video frame, the center coordinates of the offset second target area are, for example, (12, 15). Correspondingly, the coordinates of the bottom left corner of the offset second target area are (10, 13), and the coordinates of the top right corner are (14, 17). The terminal maps the offset second target area to the first video frame to obtain the first target area in the first video frame, thereby determining the first target area in the first video frame. In some embodiments, there are a plurality of the first target areas, that is, the terminal can offset the second target area multiple times to obtain a plurality of offset second target areas. The terminal maps the plurality of offset second target areas to the first video frame to obtain a plurality of first target areas. Subsequently, the terminal can perform target detection based on the plurality of first target areas, that is, game character detection in the game scene. In addition to inversely inferring the second target area based on the center coordinates of the game character in the second video frame, the terminal can directly determine the second target area in the second video frame. That is, after determining the second target area where the game character is located from the second video frame, the terminal can store the coordinates of the second target area in a cache, and subsequently directly read from the cache the second target area where the game character is located in the second video frame without the need for calculation for inverse inference. In this way, the computational complexity of the terminal is reduced, and the computational efficiency of the terminal is improved.

2. For example, the target object is a target vehicle, and the display time of the second video frame is 0.5 s earlier than that of the first video frame. In a case that the terminal determines that center coordinates of the target vehicle in the second video frame are (0, 2), the terminal can determine the second target area centered on the center coordinates (0, 2). In a case that the second target area is a rectangular area having a length of 4 and a width of 2, the coordinates of the bottom left corner of the second target area are (−2, 1), and the coordinates of the top right corner are (2, 3). The terminal can uniquely determine the second target area based on the coordinates of the bottom left corner and the coordinates of the top right corner. After the terminal offsets the second target area based on the first video frame and the second video frame, the center coordinates of the offset second target area are, for example, (2, 2). Correspondingly, the coordinates of the bottom left corner of the offset second target area are (0, 2), and the coordinates of the top right corner are (4, 3). The terminal maps the offset second target area to the first video frame to obtain the first target area in the first video frame, thereby determining the first target area in the first video frame. In some embodiments, there are a plurality of the first target areas, that is, the terminal can offset the second target area multiple times to obtain a plurality of offset second target areas. The terminal maps the plurality of offset second target areas to the first video frame to obtain a plurality of first target areas. Subsequently, the terminal can perform target detection based on the plurality of first target areas, that is, target vehicle detection. In addition to inversely inferring the second target area based on the center coordinates of the target vehicle in the second video frame, the terminal can also directly determine the second target area in the second video frame. That is, after determining the second target area where the target vehicle is located from the second video frame, the terminal can store the coordinates of the second target area in a cache, and subsequently directly read from the cache the second target area where the target vehicle is located in the second video frame without the need for calculation for inverse inference. In this way, the computational complexity of the terminal is reduced, and the computational efficiency of the terminal is improved.

On the basis of the above implementation, the method for the terminal to offset the second target area will be described below.

In a possible implementation, the terminal determines, based on a display time difference between the first video frame and the second video frame, a distance which the second target area is to be offset. The offset distance is directly proportional to the display time difference. The display time difference is a difference between the time of displaying the first video frame and the time of displaying the second video frame in case of playing a video.

In this implementation, the greater the display time difference between the first video frame and the second video frame, the greater the extent of the position change of the target object in the video frames may be. The terminal can determine the distance which the second target area is to be offset according to the display time difference between the first video frame and the second video frame, which increases the probability that the first target area contains the target object, thereby improving the target detection efficiency.

For example, the terminal determines the distance which the second target area is to be offset based on the display time difference by using an inversely proportional function. For example, the terminal can determine the distance which the second target area is to be offset by formula (1).

$$y=K/x \qquad (1),$$

where y is the distance which the second target area is to be offset, x is the display time difference between the first video frame and the second video frame, x>0, K is the constant of the inversely proportional function that is set by the technicians according to the actual situations, and K≠0.

The terminal can determine the distance which the second target area is to be offset based on the display time difference between the first video frame and the second video frame not only by the inversely proportional function, but also by other functions, which is not limited in this embodiment of this disclosure.

On the basis of the above implementation, in a case that the first video frame is the starting video frame in the video, the terminal can perform template matching on the first video frame by using a template image of the target object, and determine the first target area from the first video frame.

In this implementation, since the first video frame is the starting video frame in the video, then there is no second video frame before the first video frame, and the terminal can perform template matching on the first video frame by using the template image of the target object to obtain the first target area to be detected. Due to the high efficiency of template matching, the efficiency of determining the first target area is also high.

For example, the terminal slides on the first video frame by using the template image of the target object, acquires similarities between the target image and a plurality of covered areas on the first video frame, and determines the area with the highest similarity as the first target area to be detected.

402: The terminal performs multiband filtering on the first target area in the first video frame to obtain a plurality of band subimages.

In a possible implementation, the terminal inputs the first target area into a band filter bank, and performs multiband filtering on the first target area through a plurality of band filters in the band filter bank to obtain the plurality of band subimages. In some embodiments, the band filter is a non subsampled pyramid filter.

In this implementation, since the non subsampled pyramid filter is used in the process of filtering the first target area and there is no subsampling process for the non subsampled pyramid filter, the outputted band subimage has the same size as the first target area. In this way, the process of image enlargement and image registration after the subsampling is eliminated, thereby improving the accuracy of subsequent target detection. In the subsampling process, the resolution of the image is also reduced. For example, if a reference image with a resolution of 512×512 exists, the process of subsampling the reference image is also a process of reducing the resolution of the reference image, or a process of extracting some pixels from the reference image to obtain a new reference image. In some embodiments, the terminal extracts pixels in odd rows and columns from the reference image with the resolution of 512×512, and recombines the extracted pixels to obtain a new reference image whose resolution becomes 256×256.

The above implementation will be described below by way of two examples.

Figure 5:
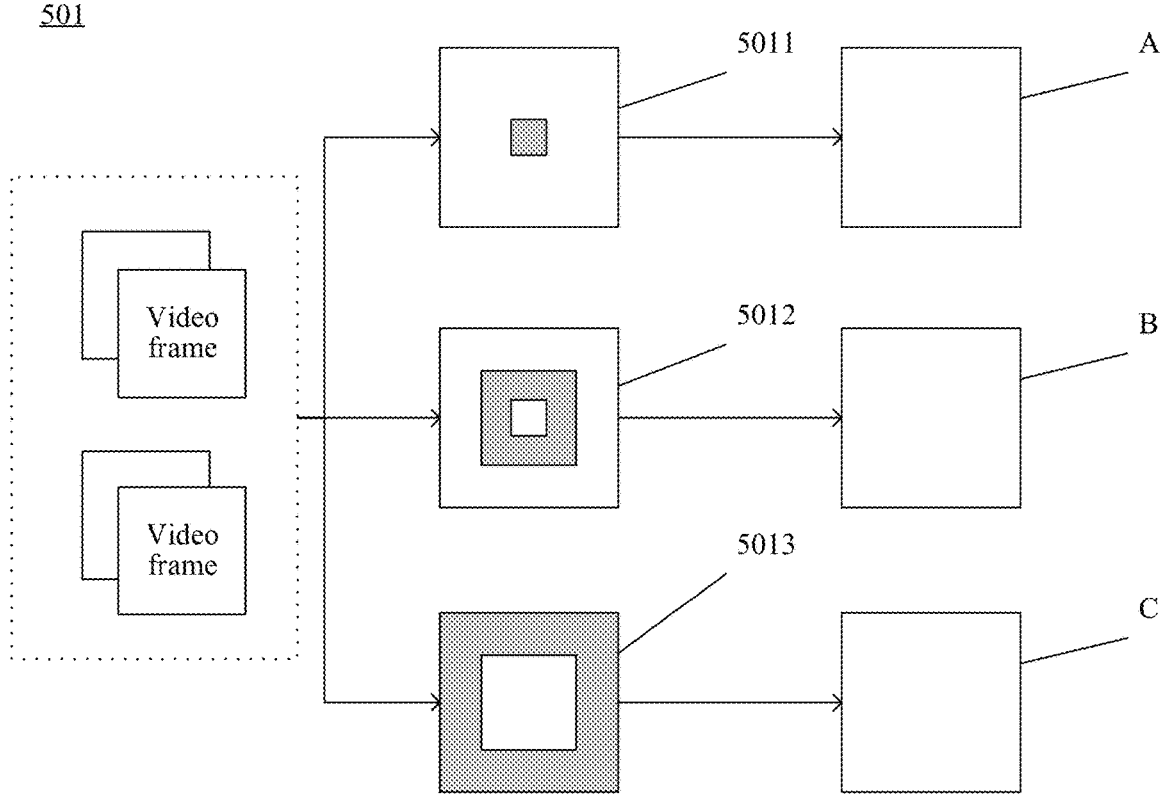
FIG. 5 is a schematic structural diagram of a band filter bank according to an embodiment of this disclosure.

Example 1: The terminal performs time-frequency transform on the first video frame to obtain a first frequency domain image of the first video frame. The terminal inputs the first target area in the first frequency domain image into a band filter bank. The band filter bank includes a plurality of band filters, each band filter corresponding to a different frequency range. The terminal performs filtering on the first target area through the plurality of band filters in the band filter bank, such that a plurality of band subimages are outputted by the plurality of band filters. Each band subimage corresponds to one band filter. Since different band filters correspond to different frequency ranges, the band subimages are frequency domain images in different frequency ranges. Referring to FIG. 5, provided is a schematic image of a band filter bank 501. The band filter bank 501 includes a band filter 5011, a band filter 5012 and a band filter 5013. The three band filters correspond to different frequency ranges. In this way, the terminal can decompose the first target area into a band subimage A, a band subimage B and a band subimage C through the three band filters. The band subimage A, the band subimage B and the band subimage C respectively correspond to different frequency ranges.

The method of the terminal performing the multiband filtering on the first target area through the band filter bank to obtain the plurality of band subimages will be further described below on the basis of the above Example 1.

Still referring to FIG. 5, the terminal performs fast Fourier transform on the first video frame to obtain a first frequency domain image of the first video frame. The terminal inputs a first target area $$\begin{pmatrix} 1 & 2 & 1 & 1 \\ 0 & 1 & 1 & 0 \\ 1 & 2 & 1 & 2 \\ 1 & 1 & 0 & 0 \end{pmatrix}$$

in the first video frame into the band filter bank, i.e., inputs a first target area of the first frequency domain image into the band filter bank. The band filter bank includes three band filters: a band filter 5011, a band filter 5012 and a band filter 5013. The filter matrix of the band filter 5011 is $$\begin{pmatrix} 1 & 0 & 0 \\ 0 & 0 & 0 \\ 0 & 0 & -1 \end{pmatrix},$$

the filter matrix of the band filter 5012 is $$\begin{pmatrix} 2 & 0 & 0 \\ 0 & 0 & 0 \\ 0 & 0 & -2 \end{pmatrix},$$

and the filter matrix of the band filter 5013 is $$\begin{pmatrix} 4 & 0 & 0 \\ 0 & 0 & 0 \\ 0 & 0 & -4 \end{pmatrix}.$$

The terminal performs edge filling on the first target area $$\begin{pmatrix} 1 & 2 & 1 & 1 \\ 0 & 1 & 1 & 0 \\ 1 & 2 & 1 & 2 \\ 1 & 1 & 0 & 0 \end{pmatrix}$$

to obtain a filled image $$\begin{pmatrix} 0 & 0 & 0 & 0 & 0 & 0 \\ 0 & 1 & 2 & 1 & 1 & 0 \\ 0 & 0 & 1 & 1 & 0 & 0 \\ 0 & 1 & 2 & 1 & 2 & 0 \\ 0 & 1 & 1 & 0 & 0 & 0 \\ 0 & 0 & 0 & 0 & 0 & 0 \end{pmatrix}$$

of the first target area. The terminal performs band filtering on the filled image of the first target area respectively using the filter matrices $$\begin{pmatrix} 1 & 0 & 0 \\ 0 & 0 & 0 \\ 0 & 0 & -1 \end{pmatrix}, \begin{pmatrix} 2 & 0 & 0 \\ 0 & 0 & 0 \\ 0 & 0 & -2 \end{pmatrix} \text{ and } \begin{pmatrix} 4 & 0 & 0 \\ 0 & 0 & 0 \\ 0 & 0 & -4 \end{pmatrix}$$

of the three band filters to obtain three band subimages $$\begin{pmatrix} -1 & -1 & 0 & 0 \\ -2 & 0 & 0 & 1 \\ -1 & 0 & 1 & 1 \\ 0 & 1 & 2 & 1 \end{pmatrix}, \begin{pmatrix} -2 & -2 & 0 & 0 \\ -4 & 0 & 0 & 2 \\ -2 & 0 & 2 & 2 \\ 0 & 2 & 4 & 2 \end{pmatrix} \text{ and } \begin{pmatrix} -4 & -4 & 0 & 0 \\ -8 & 0 & 0 & 4 \\ -4 & 0 & 4 & 4 \\ 0 & 4 & 8 & 4 \end{pmatrix}.$$

Example 2: The terminal performs time-frequency transform on the first video frame to obtain a first frequency domain image of the first video frame. The terminal inputs the first target area in the first frequency domain image into a band filter bank. The band filter bank includes a plurality of band filters at different levels.

Figure 6:
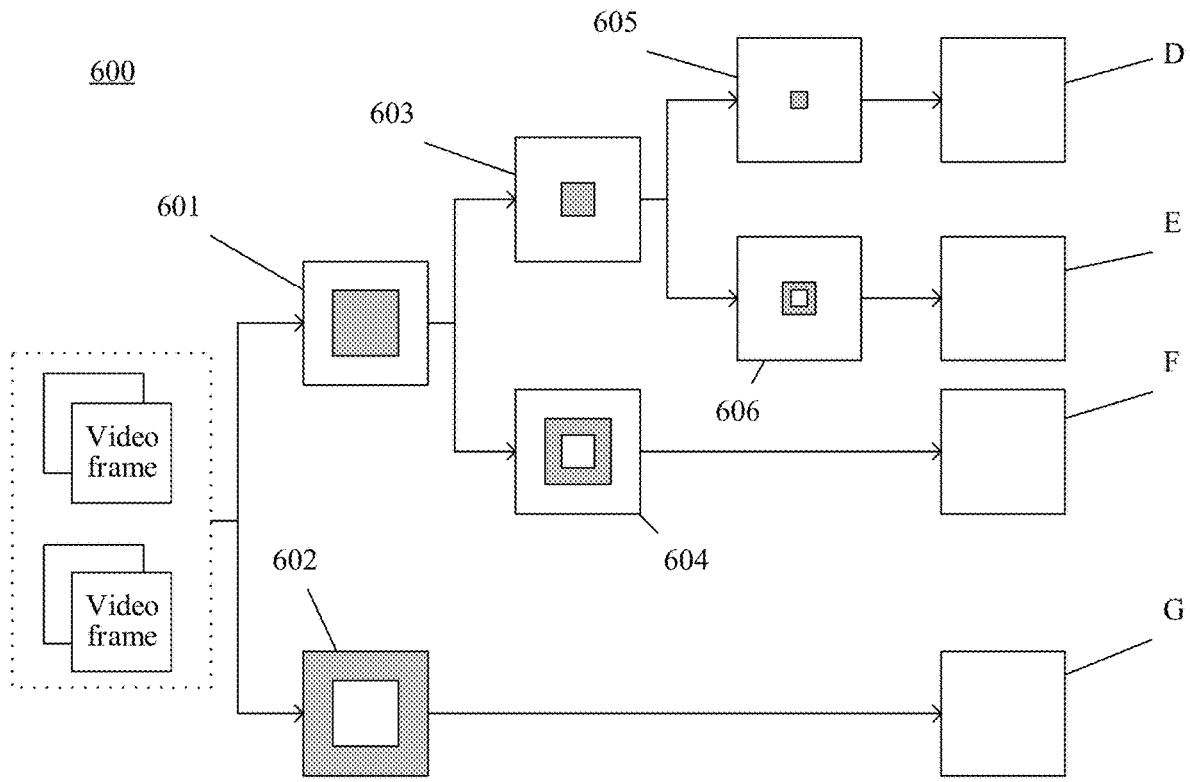
FIG. 6 is a schematic structural diagram of a band filter bank according to an embodiment of this disclosure.

The terminal performs multilevel filtering on the first target area through the plurality of band filters at different levels to obtain a plurality of band subimages. Referring to FIG. 6, provided is a structure of another band filter bank 600. The band filter bank includes a first low-pass filter 601 and a first high-pass filter 602. A second low-pass filter 603 and a second high-pass filter 604 are further connected after the first low-pass filter 601. In some embodiments, a third low-pass filter 605 and a third high-pass filter 606 are further connected after the second low-pass filter 603, and so on. The first low-pass filter 601, the second low-pass filter 603 and the third low-pass filter 605 constitute the low-pass filters at three levels. The first high-pass filter 602, the second high-pass filter 604 and the third high-pass filter 606 constitute the high-pass filters at three levels. The terminal can decompose the first target area into a band subimage D, a band subimage E, a band subimage F and a band subimage G through the band filters at multiple levels as shown in FIG. 6.

The method of the terminal performing the multiband filtering on the first target area through the band filter bank to obtain the plurality of band subimages will be further described below on the basis of above Example 2.

For example, the terminal performs fast Fourier transform on the first video frame to obtain a first frequency domain image of the first video frame. The terminal inputs the first target area $$\begin{pmatrix} 1 & 2 & 1 & 1 \\ 0 & 1 & 1 & 0 \\ 1 & 2 & 1 & 2 \\ 1 & 1 & 0 & 0 \end{pmatrix}$$

in the first frequency domain image into the band filter bank. Referring to FIG. 6, the band filter bank includes 6 band filters: the first low-pass filter 601, the second low-pass filter 603, the third low-pass filter 605, the first high-pass filter 602, the second high-pass filter 604 and the third high-pass filter 606. The terminal performs edge filling on the first target area $$\begin{pmatrix} 1 & 2 & 1 & 1 \\ 0 & 1 & 1 & 0 \\ 1 & 2 & 1 & 2 \\ 1 & 1 & 0 & 0 \end{pmatrix}$$

to obtain a filled image $$\begin{pmatrix} 0 & 0 & 0 & 0 & 0 & 0 \\ 0 & 1 & 2 & 1 & 1 & 0 \\ 0 & 0 & 1 & 1 & 0 & 0 \\ 0 & 1 & 2 & 1 & 2 & 0 \\ 0 & 1 & 1 & 0 & 0 & 0 \\ 0 & 0 & 0 & 0 & 0 & 0 \end{pmatrix}$$

of the first target area. The terminal performs band filtering on the filled image of the first target area respectively using the first low-pass filter $$\begin{pmatrix} 0 & 0 & 0 \\ 0 & 1 & 0 \\ 0 & 0 & -1 \end{pmatrix}$$

and the first high-pass filter $$\begin{pmatrix} 0 & 0 & 0 \\ 0 & -1 & 0 \\ 1 & 0 & 0 \end{pmatrix}$$

to obtain a first low-pass subimage $$\begin{pmatrix} 0 & 1 & 1 & 1 \\ -2 & 0 & -1 & 0 \\ 0 & 2 & 1 & 2 \\ 1 & 1 & 0 & 0 \end{pmatrix}$$

and a first high-pass subimage $$\begin{pmatrix} -1 & -2 & 0 & 0 \\ 0 & 0 & 1 & 1 \\ -1 & -1 & 0 & -2 \\ -1 & -1 & 0 & 0 \end{pmatrix}.$$

The terminal performs edge filling on the first low-pass subimage $$\begin{pmatrix} 0 & 1 & 1 & 1 \\ -2 & 0 & -1 & 0 \\ 0 & 2 & 1 & 2 \\ 1 & 1 & 0 & 0 \end{pmatrix}$$

to obtain a filled image $$\begin{pmatrix} 0 & 0 & 0 & 0 & 0 & 0 \\ 0 & 0 & 1 & 1 & 1 & 0 \\ 0 & -2 & 0 & -1 & 0 & 0 \\ 0 & 0 & 2 & 1 & 2 & 0 \\ 0 & 1 & 1 & 0 & 0 & 0 \\ 0 & 0 & 0 & 0 & 0 & 0 \end{pmatrix}$$

of the first low-pass subimage. The terminal inputs the filled image $$\begin{pmatrix} 0 & 0 & 0 & 0 & 0 & 0 \\ 0 & 0 & 1 & 1 & 1 & 0 \\ 0 & -2 & 0 & -1 & 0 & 0 \\ 0 & 0 & 2 & 1 & 2 & 0 \\ 0 & 1 & 1 & 0 & 0 & 0 \\ 0 & 0 & 0 & 0 & 0 & 0 \end{pmatrix}$$

of the first low-pass subimage respectively into the second low-pass filter $$\begin{pmatrix} 1 & 0 & 0 \\ 0 & -1 & 0 \\ 0 & 0 & 0 \end{pmatrix}$$

and the second high-pass filter $$\begin{pmatrix} 0 & 0 & -1 \\ 0 & 1 & 0 \\ 0 & 0 & 0 \end{pmatrix}$$

to obtain a second low-pass subimage $$\begin{pmatrix} 0 & -1 & -1 & -1 \\ 2 & 0 & 2 & 1 \\ 0 & -4 & -1 & -3 \\ -1 & -1 & 0 & 0 \end{pmatrix}$$

and a second high-pass subimage $$\begin{pmatrix} 0 & 1 & 1 & 1 \\ -3 & -1 & -2 & 0 \\ 0 & 3 & 1 & 2 \\ -1 & 0 & -2 & 0 \end{pmatrix}.$$

The terminal performs edge filling on the second low-pass subimage $$\begin{pmatrix} 0 & -1 & -1 & -1 \\ 2 & 0 & 2 & 1 \\ 0 & -4 & -1 & -3 \\ -1 & -1 & 0 & 0 \end{pmatrix}$$

to obtain a filled image $$\begin{pmatrix} 0 & 0 & 0 & 0 & 0 & 0 \\ 0 & 0 & -1 & -1 & -1 & 0 \\ 0 & 2 & 0 & 2 & 1 & 0 \\ 0 & 0 & -4 & -1 & -3 & 0 \\ 0 & -1 & -1 & 0 & 0 & 0 \\ 0 & 0 & 0 & 0 & 0 & 0 \end{pmatrix}$$

of the second low-pass subimage. The terminal inputs the filled image of the second low-pass subimage respectively into the third low-pass filter $$\begin{pmatrix} 1 & 0 & 0 \\ 0 & 1 & 0 \\ 0 & 0 & 1 \end{pmatrix}$$

and the third high-pass filter $$\begin{pmatrix} 0 & 0 & 1 \\ 0 & 1 & 0 \\ 1 & 0 & 0 \end{pmatrix}$$

to obtain a third low-pass subimage $$\begin{pmatrix} 0 & 1 & 0 & -1 \\ -2 & -1 & -2 & 0 \\ -1 & -2 & -1 & -1 \\ -1 & -1 & -4 & -1 \end{pmatrix}$$

and a third high-pass subimage $$\begin{pmatrix} 0 & 1 & -1 & 1 \\ 1 & -1 & -3 & 0 \\ 0 & -5 & -1 & -3 \\ -5 & -2 & -3 & 0 \end{pmatrix}.$$

The third low-pass subimage, the third high-pass subimage, the second high-pass subimage and the first high-pass subimage respectively correspond to the band subimage D, the band subimage E, the band subimage F and the band subimage G. Experiments show that the low-pass subimage does not significantly contribute to model classification, so the terminal can ignore the band subimage D, i.e., the third low-pass subimage, in the subsequent processing process to reduce the computational complexity.

403: The terminal performs multidirectional filtering on the plurality of band subimages to obtain a plurality of direction subimages.

In a possible implementation, for any band subimage in the plurality of band subimages, the terminal inputs the band subimage into a directional filter bank, and performs the multidirectional filtering on the band subimage through a plurality of directional filters in the directional filter bank to obtain a plurality of direction features corresponding to the band subimage. The terminal inputs the direction features into a corresponding reconstruction filter in the directional filter bank. The terminal generates a plurality of direction subimages of the band subimage based on the inputted direction features through the reconstruction filter. In some embodiments, the directional filters and the reconstruction filter are all non subsampled filters.

In this implementation, after decomposing the first target area into the plurality of band subimages, the terminal can further decompose each band subimage based on directions to obtain the plurality of direction subimages of each band subimage, and subsequently, the features of the first target area can be fully expressed based on the plurality of direction subimages corresponding to the plurality of band subimages.

The above implementation will be described by taking the terminal performing four-direction filtering on one band subimage as an example.

Figure 7:
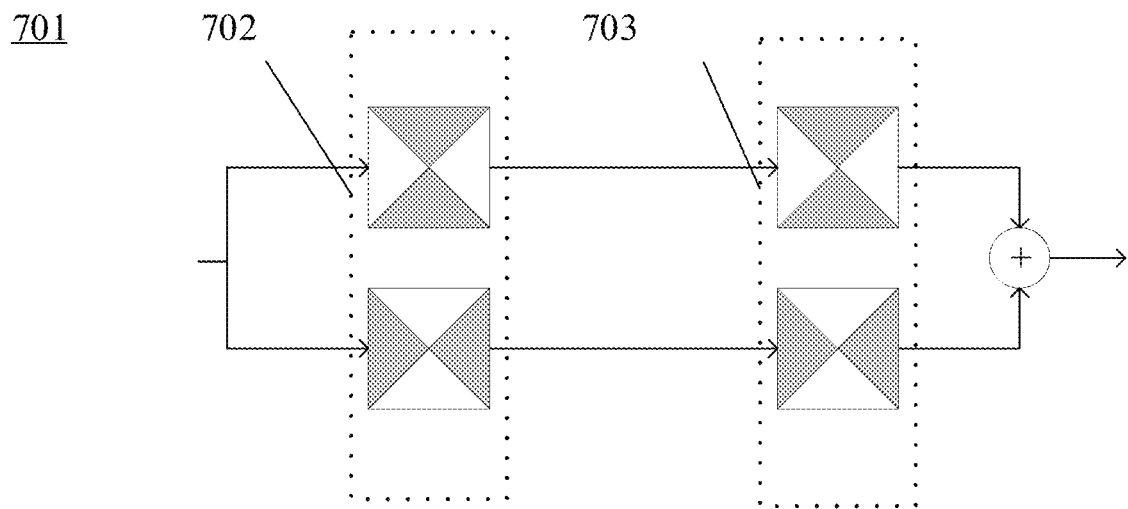
FIG. 7 is a schematic structural diagram of a directional filter bank according to an embodiment of this disclosure.
Figure 8:
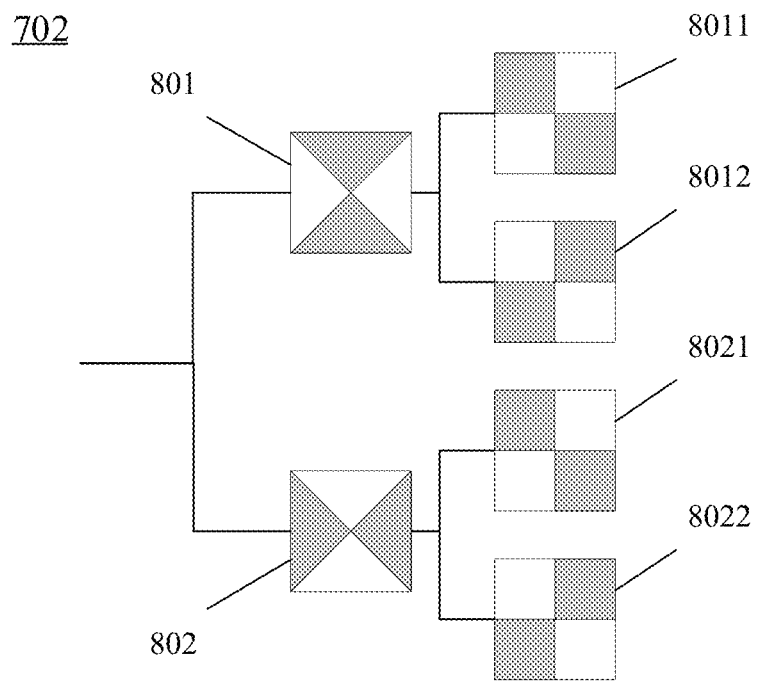
FIG. 8 is a schematic structural diagram of a directional filter bank according to an embodiment of this disclosure.

In order to explain more clearly, the structure of the directional filter bank is introduced first. Referring to FIG. 7, provided is a schematic structural diagram of a directional filter bank 701. The directional filter bank 701 includes a directional filter 702 and a reconstruction filter 703. If the directional filter is to be used to perform the four-direction filtering on the band subimage, then a two-level filter structure exists in the directional filter 702. Referring to FIG. 8, a wedge filter 801 and a wedge filter 802 at the first level exist in the directional filter 702. The direction of white in the wedge filter 801 and the wedge filter 802 is the direction that the filter allows passage, and the direction of gray in the wedge filter 801 and the wedge filter 802 is the direction that the filter does not allow passage. After the wedge filter 801 and the wedge filter 802 at the first level, two square filters at the second level are further respectively connected. A square filter 8011 and a square filter 8012 are connected after the wedge filter 801. A square filter 8021 and a square filter 8022 are connected after the wedge filter 802. The direction of white in the square filter is the direction that the filter allows passage, and the direction of gray in the square filter is the direction that the filter does not allow passage. With the combination of the wedge filters and the square filters, the terminal can decompose the first band subimage into direction subimages in four directions. The reconstruction filter 703 has a structure symmetric with the directional filter 702, that is, four direction subimages are inputted into the reconstruction filter 703, and one composite band subimage is outputted.

After the structure of the directional filter bank is introduced, the method of the terminal decomposing one band subimage into four direction subimages will be described with reference to the structure of the directional filter bank.

If one band subimage $$\begin{pmatrix} -1 & -1 & 0 & 0 \\ -2 & 0 & 0 & 1 \\ -1 & 0 & 1 & 1 \\ 0 & 1 & 2 & 1 \end{pmatrix}$$

exists, the terminal inputs the band subimage $$\begin{pmatrix} -1 & -1 & 0 & 0 \\ -2 & 0 & 0 & 1 \\ -1 & 0 & 1 & 1 \\ 0 & 1 & 2 & 1 \end{pmatrix}$$

into the directional filter bank 701, and performs directional filtering on the band subimage $$\begin{pmatrix} -1 & -1 & 0 & 0 \\ -2 & 0 & 0 & 1 \\ -1 & 0 & 1 & 1 \\ 0 & 1 & 2 & 1 \end{pmatrix}$$

through the directional filter 702 in the directional filter bank. Referring to FIG. 8, the terminal inputs the band subimage $$\begin{pmatrix} -1 & -1 & 0 & 0 \\ -2 & 0 & 0 & 1 \\ -1 & 0 & 1 & 1 \\ 0 & 1 & 2 & 1 \end{pmatrix}$$

into the wedge filter 801, and performs directional filtering on the band subimage $$\begin{pmatrix} -1 & -1 & 0 & 0 \\ -2 & 0 & 0 & 1 \\ -1 & 0 & 1 & 1 \\ 0 & 1 & 2 & 1 \end{pmatrix}$$

through a wedge filter matrix $$\begin{pmatrix} 1 & 1 & 1 & 1 \\ 0 & 1 & 1 & 0 \\ 0 & 1 & 1 & 0 \\ 1 & 1 & 1 & 1 \end{pmatrix}$$

of the wedge filter 801, i.e., multiplies the wedge filter matrix by the value of the corresponding position of the band subimage, to obtain a first-level direction feature $$\begin{pmatrix} -1 & -1 & 0 & 0 \\ 0 & 0 & 0 & 0 \\ 0 & 0 & 1 & 0 \\ 0 & 1 & 2 & 1 \end{pmatrix}.$$

The terminal inputs the first-level direction feature $$\begin{pmatrix} -1 & -1 & 0 & 0 \\ 0 & 0 & 0 & 0 \\ 0 & 0 & 1 & 0 \\ 0 & 1 & 2 & 1 \end{pmatrix}$$

into the square filter 8011 after the wedge filter 801, and performs directional filtering on the first-level direction feature $$\begin{pmatrix} -1 & -1 & 0 & 0 \\ 0 & 0 & 0 & 0 \\ 0 & 0 & 1 & 0 \\ 0 & 1 & 2 & 1 \end{pmatrix}$$

through a square filter matrix $$\begin{pmatrix} 1 & 1 & 0 & 0 \\ 1 & 1 & 0 & 0 \\ 0 & 0 & 1 & 1 \\ 0 & 0 & 1 & 1 \end{pmatrix}$$

of the square filter 8011, i.e., multiplies the square filter matrix by the value of the corresponding position of the first-level direction feature, to obtain one second-level direction feature $$\begin{pmatrix} -1 & -1 & 0 & 0 \\ 0 & 0 & 0 & 0 \\ 0 & 0 & 1 & 0 \\ 0 & 0 & 2 & 1 \end{pmatrix}.$$

The terminal inputs the second-level direction feature into the reconstruction filter 703, and generates one direction subimage of the band subimage, for example $$\begin{pmatrix} 1 & 1 & 0 & 0 \\ 0 & 0 & 0 & 0 \\ 0 & 0 & 1 & 0 \\ 0 & 0 & 2 & 1 \end{pmatrix},$$

based on the inputted second-level direction feature $$\begin{pmatrix} -1 & -1 & 0 & 0 \\ 0 & 0 & 0 & 0 \\ 0 & 0 & 1 & 0 \\ 0 & 0 & 2 & 1 \end{pmatrix}$$

through the reconstruction filter. The terminal inputs the first-level direction feature $$\begin{pmatrix} -1 & -1 & 0 & 0 \\ 0 & 0 & 0 & 0 \\ 0 & 0 & 1 & 0 \\ 0 & 1 & 2 & 1 \end{pmatrix}$$

into the square filter 8012 after the wedge filter 801, and performs directional filtering on the first-level direction feature $$\begin{pmatrix} -1 & -1 & 0 & 0 \\ 0 & 0 & 0 & 0 \\ 0 & 0 & 1 & 0 \\ 0 & 1 & 2 & 1 \end{pmatrix}$$

through a square filter matrix $$\begin{pmatrix} 0 & 0 & 1 & 1 \\ 0 & 0 & 1 & 1 \\ 1 & 1 & 0 & 0 \\ 1 & 1 & 0 & 0 \end{pmatrix}$$

of the square filter 8012, i.e., multiplies the square filter matrix by the value of the corresponding position of the first-level direction feature, to obtain another second-level direction feature $$\begin{pmatrix} 0 & 0 & 0 & 0 \\ 0 & 0 & 0 & 0 \\ 0 & 0 & 0 & 0 \\ 0 & 1 & 0 & 0 \end{pmatrix}.$$

The terminal inputs the second-level direction feature $$\begin{pmatrix} 0 & 0 & 0 & 0 \\ 0 & 0 & 0 & 0 \\ 0 & 0 & 0 & 0 \\ 0 & 1 & 0 & 0 \end{pmatrix}$$

into the reconstruction filter 703, and generates another direction subimage of the band subimage, for example $$\begin{pmatrix} 0 & 0 & 0 & 1 \\ 0 & 0 & 0 & 0 \\ 0 & 0 & 0 & 0 \\ 0 & 1 & 0 & 0 \end{pmatrix},$$

based on the inputted second-level direction feature $$\begin{pmatrix} 0 & 0 & 0 & 0 \\ 0 & 0 & 0 & 0 \\ 0 & 0 & 0 & 0 \\ 0 & 1 & 0 & 0 \end{pmatrix}$$

through the reconstruction filter.

In addition, the processing process of the terminal using the wedge filter 802 and the processing process of the terminal using the wedge filter 801 are analogous, and the processing process of the terminal using the square filter 8021 and the square filter 8022 and the processing process of the terminal using the square filter 8011 and the square filter 8012 also are analogous, so the details will not be repeated here. Through the above processing process, the terminal can decompose one band subimage into four direction subimages. When a plurality of band subimages exist, since each band subimage is decomposed into 4 direction subimages, N band subimages is decomposed into 4N direction subimages. N is a positive integer.

In the above illustration process, the description is made by way of the example of the terminal decomposing each band subimage into 4 direction subimages. In other possible implementations, the terminal may also decompose each band subimage into 8 or more band subimages, which only requires the addition of different shapes of filters after the square filter 8011, the square filter 8012, the square filter 8021 and the square filter 8022. The method of decomposing one band subimage into 8 direction subimages is analogous to the method of decomposing one band subimage into 4 direction subimages, and will not be repeated here.

404: The terminal acquires a direction-band fused feature of the first target area according to the plurality of direction subimages.

In a possible implementation, the terminal acquires energies of a plurality of first direction subimages corresponding to any band subimage in the plurality of band subimage. The terminal sorts the plurality of first direction subimages in descending order of energies to obtain a plurality of reference direction subimages. The plurality of reference direction subimages are the sorted first direction subimages. The terminal acquires the direction-band fused feature of the first target area based on the plurality of reference direction subimages and a plurality of second direction subimages. The second direction subimages are direction subimages corresponding to other band subimages in the plurality of band subimages except the band subimage.

In this implementation, the terminal can acquire the direction-band fused feature of the first target area by sorting the plurality of direction subimages corresponding to any band subimage in the plurality of band subimages instead of processing band features one by one, thereby reducing the computational complexity of the terminal.

In order to describe the above implementation more clearly, the above implementation will be described in several parts below.

In the first part, the method of the terminal acquiring the energies of the plurality of first direction subimages corresponding to any band subimage in the plurality of band subimage is described. In the description below, the energy of the corresponding direction subimage acquired by the terminal is represented by the sum of squares of values in the direction subimages. In other possible implementations, the energy of the corresponding direction subimage may also be represented by other forms, which are not limited in this embodiment of this disclosure. For example, the energy of the corresponding direction subimage may be represented by the two-norm of the sum of squares of the values in the corresponding subimage.

Taking one band subimage corresponding to four direction subimages as an example, the terminal determines any band subimage, for example $$\begin{pmatrix} -1 & -1 & 0 & 0 \\ -2 & 0 & 0 & 1 \\ -1 & 0 & 1 & 1 \\ 0 & 1 & 2 & 1 \end{pmatrix},$$

from the plurality of band subimages. The terminal acquires four first direction subimages $$\begin{pmatrix} 0 & 0 & 0 & 0 \\ 0 & 0 & 0 & 0 \\ 0 & 0 & 0 & 0 \\ 0 & 1 & 0 & 0 \end{pmatrix}, \begin{pmatrix} 0 & 0 & 0 & 0 \\ 0 & 0 & 0 & 1 \\ -1 & 0 & 0 & 0 \\ 0 & 0 & 0 & 0 \end{pmatrix}, \begin{pmatrix} -1 & -1 & 0 & 0 \\ 0 & 0 & 0 & 0 \\ 0 & 0 & 1 & 0 \\ 0 & 0 & 2 & 1 \end{pmatrix} \text{ and } \begin{pmatrix} -1 & 0 & 0 & 0 \\ -2 & 0 & 0 & 0 \\ 0 & 0 & 1 & 1 \\ 0 & 0 & 0 & 1 \end{pmatrix}$$

corresponding to the band subimage $$\begin{pmatrix} -1 & -1 & 0 & 0 \\ -2 & 0 & 0 & 1 \\ -1 & 0 & 1 & 1 \\ 0 & 1 & 2 & 1 \end{pmatrix}.$$

The terminal acquires the energies of the four first direction subimages $$\begin{pmatrix} 0 & 0 & 0 & 0 \\ 0 & 0 & 0 & 0 \\ 0 & 0 & 0 & 0 \\ 0 & 1 & 0 & 0 \end{pmatrix}, \begin{pmatrix} 0 & 0 & 0 & 0 \\ 0 & 0 & 0 & 1 \\ -1 & 0 & 0 & 0 \\ 0 & 0 & 0 & 0 \end{pmatrix}, \begin{pmatrix} -1 & -1 & 0 & 0 \\ 0 & 0 & 0 & 0 \\ 0 & 0 & 1 & 0 \\ 0 & 0 & 2 & 1 \end{pmatrix} \text{ and } \begin{pmatrix} -1 & 0 & 0 & 0 \\ -2 & 0 & 0 & 0 \\ 0 & 0 & 1 & 1 \\ 0 & 0 & 0 & 1 \end{pmatrix},$$

and in some embodiments, the energies are the sum of squares of the values in each of the four first direction subimages. In this case, the energy of the first direction subimage $$\begin{pmatrix} 0 & 0 & 0 & 0 \\ 0 & 0 & 0 & 0 \\ 0 & 0 & 0 & 0 \\ 0 & 1 & 0 & 0 \end{pmatrix}$$

is 1, the energy of the first direction subimage $$\begin{pmatrix} 0 & 0 & 0 & 0 \\ 0 & 0 & 0 & 1 \\ -1 & 0 & 0 & 0 \\ 0 & 0 & 0 & 0 \end{pmatrix}$$

is 2, the energy of the first direction subimage $$\begin{pmatrix} -1 & -1 & 0 & 0 \\ 0 & 0 & 0 & 0 \\ 0 & 0 & 1 & 0 \\ 0 & 0 & 2 & 1 \end{pmatrix}$$

is 7, and the energy of the first direction subimage $$\begin{pmatrix} -1 & 0 & 0 & 0 \\ -2 & 0 & 0 & 0 \\ 0 & 0 & 1 & 1 \\ 0 & 0 & 0 & 1 \end{pmatrix}$$

is 8.

In the second part, the method of the terminal sorting the plurality of first direction subimages in descending order of energies to obtain the plurality of reference direction subimages is described.

Taking one band subimage corresponding to four direction subimages as an example, the terminal sorts the four first direction subimages $$\begin{pmatrix} 0 & 0 & 0 & 0 \\ 0 & 0 & 0 & 0 \\ 0 & 0 & 0 & 0 \\ 0 & 1 & 0 & 0 \end{pmatrix}, \begin{pmatrix} 0 & 0 & 0 & 0 \\ 0 & 0 & 0 & 1 \\ -1 & 0 & 0 & 0 \\ 0 & 0 & 0 & 0 \end{pmatrix}, \begin{pmatrix} -1 & -1 & 0 & 0 \\ 0 & 0 & 0 & 0 \\ 0 & 0 & 1 & 0 \\ 0 & 0 & 2 & 1 \end{pmatrix} \text{ and } \begin{pmatrix} -1 & 0 & 0 & 0 \\ -2 & 0 & 0 & 0 \\ 0 & 0 & 1 & 1 \\ 0 & 0 & 0 & 1 \end{pmatrix}$$

to obtain the sorted four first direction subimages $$\begin{pmatrix} -1 & 0 & 0 & 0 \\ -2 & 0 & 0 & 0 \\ 0 & 0 & 1 & 1 \\ 0 & 0 & 0 & 1 \end{pmatrix}, \begin{pmatrix} -1 & -1 & 0 & 0 \\ 0 & 0 & 0 & 0 \\ 0 & 0 & 1 & 0 \\ 0 & 0 & 2 & 1 \end{pmatrix}, \begin{pmatrix} 0 & 0 & 0 & 0 \\ 0 & 0 & 0 & 1 \\ -1 & 0 & 0 & 0 \\ 0 & 0 & 0 & 0 \end{pmatrix} \text{ and } \begin{pmatrix} 0 & 0 & 0 & 0 \\ 0 & 0 & 0 & 0 \\ 0 & 0 & 0 & 0 \\ 0 & 1 & 0 & 0 \end{pmatrix}$$

which are the four reference direction subimages.

In the third part, the method of the terminal acquiring the direction-band fused feature of the first target area based on the plurality of reference direction subimages and the plurality of second direction subimages is described. In order to describe the third part more clearly, the relationship between the band subimage, the plurality of band subimages and the other band subimages will be described below. The band subimage is any band subimage in the plurality of band subimage, and the other band subimages are the band subimages in the plurality of band subimages other than the band subimage.

In a possible implementation, the terminal performs weighted fusion on the plurality of reference direction subimages based on a plurality of fusion weights corresponding to the plurality of reference direction subimages to obtain a first direction fusion image corresponding to the band subimage. The fusion weight is positively correlated with the energy of the corresponding first direction subimage, i.e., positively correlated with the energy of the corresponding first direction subimage. The terminal fuses the plurality of second direction subimages respectively based on the plurality of fusion weights to obtain a plurality of second direction fusion images corresponding to the other band subimages. The terminal acquires the direction-band fused feature based on the first direction fusion image and the plurality of second direction fusion images.

The terminal can acquire the direction-band fused feature based on the first direction fusion image and the plurality of second direction fusion images by the following steps:

In a possible implementation, the terminal acquires a first integral image corresponding to the first direction fusion image; the terminal acquires a plurality of second integral images corresponding to the plurality of second direction fusion images; and the terminal splices a first integral eigenvector with a plurality of second integral eigenvectors to obtain the direction-band fused feature of the first target area. The first integral eigenvector is an integral eigenvector corresponding to the first integral image, and the second integral eigenvectors are eigenvectors corresponding to the second integral images.

The meanings of the integral image and the integral eigenvector involved in the above description will be described below. For the integral image, since the image is composed of a series of discrete pixels, the integral of the image is actually the summation. The value of each point in the integral image is the sum of all pixel values on the top left corner of the point in the original image. In this embodiment of this disclosure, the value of each point in the first integral image is the sum of all values on the top left corner of the point in the first direction fusion image, and the value of each point in the second integral image is the sum of all values on the top left corner of the point in the second direction fusion image. The integral eigenvector is the vector obtained by arranging the values in the integral image in an order from left to right and from top to bottom. In this embodiment of this disclosure, the first integral eigenvector is the vector obtained by arranging the values in the first integral image in order, and the second integral eigenvector is the vector obtained by arranging the values in the second integral image in order.

Taking one band subimage corresponding to four direction subimages as an example, the terminal determines fusion weights corresponding to the four reference direction subimages $$\begin{pmatrix} -1 & 0 & 0 & 0 \\ -2 & 0 & 0 & 0 \\ 0 & 0 & 1 & 1 \\ 0 & 0 & 0 & 1 \end{pmatrix}, \begin{pmatrix} -1 & -1 & 0 & 0 \\ 0 & 0 & 0 & 0 \\ 0 & 0 & 1 & 0 \\ 0 & 0 & 2 & 1 \end{pmatrix}, \begin{pmatrix} 0 & 0 & 0 & 0 \\ 0 & 0 & 0 & 1 \\ -1 & 0 & 0 & 0 \\ 0 & 0 & 0 & 0 \end{pmatrix} \text{ and } \begin{pmatrix} 0 & 0 & 0 & 0 \\ 0 & 0 & 0 & 0 \\ 0 & 0 & 0 & 0 \\ 0 & 1 & 0 & 0 \end{pmatrix}$$

according to the energies of the four reference direction subimages $$\begin{pmatrix} -1 & 0 & 0 & 0 \\ -2 & 0 & 0 & 0 \\ 0 & 0 & 1 & 1 \\ 0 & 0 & 0 & 1 \end{pmatrix}, \begin{pmatrix} -1 & -1 & 0 & 0 \\ 0 & 0 & 0 & 0 \\ 0 & 0 & 1 & 0 \\ 0 & 0 & 2 & 1 \end{pmatrix}, \begin{pmatrix} 0 & 0 & 0 & 0 \\ 0 & 0 & 0 & 1 \\ -1 & 0 & 0 & 0 \\ 0 & 0 & 0 & 0 \end{pmatrix} \text{ and } \begin{pmatrix} 0 & 0 & 0 & 0 \\ 0 & 0 & 0 & 0 \\ 0 & 0 & 0 & 0 \\ 0 & 1 & 0 & 0 \end{pmatrix}$$

of the band subimage $$\begin{pmatrix} -1 & -1 & 0 & 0 \\ -2 & 0 & 0 & 1 \\ -1 & 0 & 1 & 1 \\ 0 & 1 & 2 & 1 \end{pmatrix}.$$

In one embodiment, the energy of the reference direction subimage $$\begin{pmatrix} -1 & 0 & 0 & 0 \\ -2 & 0 & 0 & 0 \\ 0 & 0 & 1 & 1 \\ 0 & 0 & 0 & 1 \end{pmatrix}$$

is 8, the energy of the reference direction subimage $$\begin{pmatrix} -1 & -1 & 0 & 0 \\ 0 & 0 & 0 & 0 \\ 0 & 0 & 1 & 0 \\ 0 & 0 & 2 & 1 \end{pmatrix}$$

is 7, the energy of the reference direction subimage $$\begin{pmatrix} 0 & 0 & 0 & 0 \\ 0 & 0 & 0 & 1 \\ -1 & 0 & 0 & 0 \\ 0 & 0 & 0 & 0 \end{pmatrix}$$

is 2, and the energy of the reference direction subimage $$\begin{pmatrix} 0 & 0 & 0 & 0 \\ 0 & 0 & 0 & 0 \\ 0 & 0 & 0 & 0 \\ 0 & 1 & 0 & 0 \end{pmatrix}$$

is 1. The terminal normalizes the energies (8, 7, 2, 1) corresponding to the four reference direction subimages $$\begin{pmatrix} -1 & 0 & 0 & 0 \\ -2 & 0 & 0 & 0 \\ 0 & 0 & 1 & 1 \\ 0 & 0 & 0 & 1 \end{pmatrix}, \begin{pmatrix} -1 & -1 & 0 & 0 \\ 0 & 0 & 0 & 0 \\ 0 & 0 & 1 & 0 \\ 0 & 0 & 2 & 1 \end{pmatrix}, \begin{pmatrix} 0 & 0 & 0 & 0 \\ 0 & 0 & 0 & 1 \\ -1 & 0 & 0 & 0 \\ 0 & 0 & 0 & 0 \end{pmatrix} \text{ and } \begin{pmatrix} 0 & 0 & 0 & 0 \\ 0 & 0 & 0 & 0 \\ 0 & 0 & 0 & 0 \\ 0 & 1 & 0 & 0 \end{pmatrix}$$

to obtain the fusion weights (0.44, 0.39, 0.11, 0.06) corresponding to the four reference direction subimages $$\begin{pmatrix} -1 & 0 & 0 & 0 \\ -2 & 0 & 0 & 0 \\ 0 & 0 & 1 & 1 \\ 0 & 0 & 0 & 1 \end{pmatrix}, \begin{pmatrix} -1 & -1 & 0 & 0 \\ 0 & 0 & 0 & 0 \\ 0 & 0 & 1 & 0 \\ 0 & 0 & 2 & 1 \end{pmatrix}, \begin{pmatrix} 0 & 0 & 0 & 0 \\ 0 & 0 & 0 & 1 \\ -1 & 0 & 0 & 0 \\ 0 & 0 & 0 & 0 \end{pmatrix} \text{ and } \begin{pmatrix} 0 & 0 & 0 & 0 \\ 0 & 0 & 0 & 0 \\ 0 & 0 & 0 & 0 \\ 0 & 1 & 0 & 0 \end{pmatrix}.$$

The terminal performs weighted fusion on the four reference direction subimages $$\begin{pmatrix} -1 & 0 & 0 & 0 \\ -2 & 0 & 0 & 0 \\ 0 & 0 & 1 & 1 \\ 0 & 0 & 0 & 1 \end{pmatrix}, \begin{pmatrix} -1 & -1 & 0 & 0 \\ 0 & 0 & 0 & 0 \\ 0 & 0 & 1 & 0 \\ 0 & 0 & 2 & 1 \end{pmatrix}, \begin{pmatrix} 0 & 0 & 0 & 0 \\ 0 & 0 & 0 & 1 \\ -1 & 0 & 0 & 0 \\ 0 & 0 & 0 & 0 \end{pmatrix} \text{ and } \begin{pmatrix} 0 & 0 & 0 & 0 \\ 0 & 0 & 0 & 0 \\ 0 & 0 & 0 & 0 \\ 0 & 1 & 0 & 0 \end{pmatrix}$$

based on the fusion weights (0.44, 0.39, 0.11, 0.06) to obtain the first direction fusion image $$\begin{pmatrix} -0.83 & -0.39 & 0 & 0 \\ -0.88 & 0 & 0 & 0.11 \\ -0.11 & 0 & 0.83 & 0.44 \\ 0 & 0.06 & 0.78 & 0.83 \end{pmatrix}$$

corresponding to the band subimage. In a case that the number of the plurality of band subimages is two and the other band subimage is $$\begin{pmatrix} 0 & 1 & 1 & 1 \\ -3 & -1 & -2 & 0 \\ 0 & 3 & 1 & 2 \\ -1 & 0 & -2 & 0 \end{pmatrix},$$

the terminal can perform directional filtering on the other band subimage $$\begin{pmatrix} 0 & 1 & 1 & 1 \\ -3 & -1 & -2 & 0 \\ 0 & 3 & 1 & 2 \\ -1 & 0 & -2 & 0 \end{pmatrix}$$

to obtain four second direction subimages $$\begin{pmatrix} 0 & 0 & 1 & 1 \\ 0 & 0 & -2 & 0 \\ 0 & 3 & 0 & 0 \\ -1 & 0 & 0 & 0 \end{pmatrix}, \begin{pmatrix} 0 & 0 & 0 & 1 \\ 0 & 0 & -2 & 0 \\ 0 & 3 & 0 & 0 \\ -1 & 0 & 0 & 0 \end{pmatrix}, \begin{pmatrix} 0 & 1 & 0 & 0 \\ 0 & -1 & 0 & 0 \\ 0 & 0 & 1 & 0 \\ 0 & 0 & -2 & 0 \end{pmatrix} \text{ and } \begin{pmatrix} 0 & 0 & 0 & 0 \\ -3 & -1 & 0 & 0 \\ 0 & 0 & 1 & 2 \\ 0 & 0 & 0 & 0 \end{pmatrix}$$

of the other band subimage $$\begin{pmatrix} 0 & 1 & 1 & 1 \\ -3 & -1 & -2 & 0 \\ 0 & 3 & 1 & 2 \\ -1 & 0 & -2 & 0 \end{pmatrix}.$$

The terminal performs weighted fusion on the four second direction subimages $$\begin{pmatrix} 0 & 0 & 1 & 1 \\ 0 & 0 & -2 & 0 \\ 0 & 3 & 0 & 0 \\ -1 & 0 & 0 & 0 \end{pmatrix}, \begin{pmatrix} 0 & 0 & 0 & 1 \\ 0 & 0 & -2 & 0 \\ 0 & 3 & 0 & 0 \\ -1 & 0 & 0 & 0 \end{pmatrix}, \begin{pmatrix} 0 & 1 & 0 & 0 \\ 0 & -1 & 0 & 0 \\ 0 & 0 & 1 & 0 \\ 0 & 0 & -2 & 0 \end{pmatrix} \text{ and } \begin{pmatrix} 0 & 0 & 0 & 0 \\ -3 & -1 & 0 & 0 \\ 0 & 0 & 1 & 2 \\ 0 & 0 & 0 & 0 \end{pmatrix}$$

based on the fusion weights (0.44, 0.39, 0.11, 0.06) determined previously to obtain the second direction fusion image $$\begin{pmatrix} 0 & 0.11 & 0.44 & 0.83 \\ -0.18 & -0.17 & -1.66 & 0 \\ 0 & 2.49 & 0.17 & 0.12 \\ -0.83 & 0 & -0.16 & 0.12 \end{pmatrix}.$$

The terminal acquires the first integral image $$\begin{pmatrix} -0.83 & -1.22 & -1.22 & -1.22 \\ -1.71 & -2.1 & -2.1 & -1.99 \\ -1.82 & -2.1 & -1.27 & -0.83 \\ -1.82 & -2.04 & -0.43 & 0.84 \end{pmatrix}$$

corresponding to the first direction fusion image $$\begin{pmatrix} -0.83 & -0.39 & 0 & 0 \\ -0.88 & 0 & 0 & 0.11 \\ -0.11 & 0 & 0.83 & 0.44 \\ 0 & 0.06 & 0.78 & 0.83 \end{pmatrix}.$$

The terminal acquires a plurality of second integral images corresponding to the plurality of second direction fusion images, and in this example, i.e., acquires the second integral image $$\begin{pmatrix} 0 & 0.11 & 0.55 & 1.38 \\ -0.18 & -0.24 & -1.46 & -0.63 \\ -0.18 & 2.25 & 1.2 & 2.15 \\ -1.01 & 1.42 & 0.21 & 1.16 \end{pmatrix}$$

corresponding to the second direction fusion image $$\begin{pmatrix} 0 & 0.11 & 0.44 & 0.83 \\ -0.18 & -0.17 & -1.66 & 0 \\ 0 & 2.49 & 0.17 & 0.12 \\ -0.83 & 0 & -0.16 & 0.12 \end{pmatrix}.$$

The terminal splices the first integral eigenvector corresponding to the first integral image $$\begin{pmatrix} -0.83 & -1.22 & -1.22 & -1.22 \\ -1.71 & -2.1 & -2.1 & -1.99 \\ -1.82 & -2.1 & -1.27 & -0.83 \\ -1.82 & -2.04 & -0.43 & 0.84 \end{pmatrix}$$

with the plurality of second integral eigenvectors corresponding to the plurality of second integral images to obtain the direction-band fused feature of the first target area, and in this example, i.e., splices the first integral eigenvector, for example (1, 2, 3, 4) corresponding to the first integral image $$\begin{pmatrix} -0.83 & -1.22 & -1.22 & -1.22 \\ -1.71 & -2.1 & -2.1 & -1.99 \\ -1.82 & -2.1 & -1.27 & -0.83 \\ -1.82 & -2.04 & -0.43 & 0.84 \end{pmatrix}$$

with the second integral eigenvector, for example (2, 3, 4, 5) corresponding to the second integral image $$\begin{pmatrix} 0 & 0.11 & 0.55 & 1.38 \\ -0.18 & -0.24 & -1.46 & -0.63 \\ -0.18 & 2.25 & 1.2 & 2.15 \\ -1.01 & 1.42 & 0.21 & 1.16 \end{pmatrix}$$

to obtain the direction-band fused feature (1, 2, 3, 4, 2, 3, 4, 5) of the first target area.

405: The terminal inputs the direction-band fused feature into a target detection model, and performs prediction based on the direction-band fused feature through the target detection model to obtain a predicted label of the first target area, the predicted label being used for indicating whether the first target area includes a target object.

Figure 11:
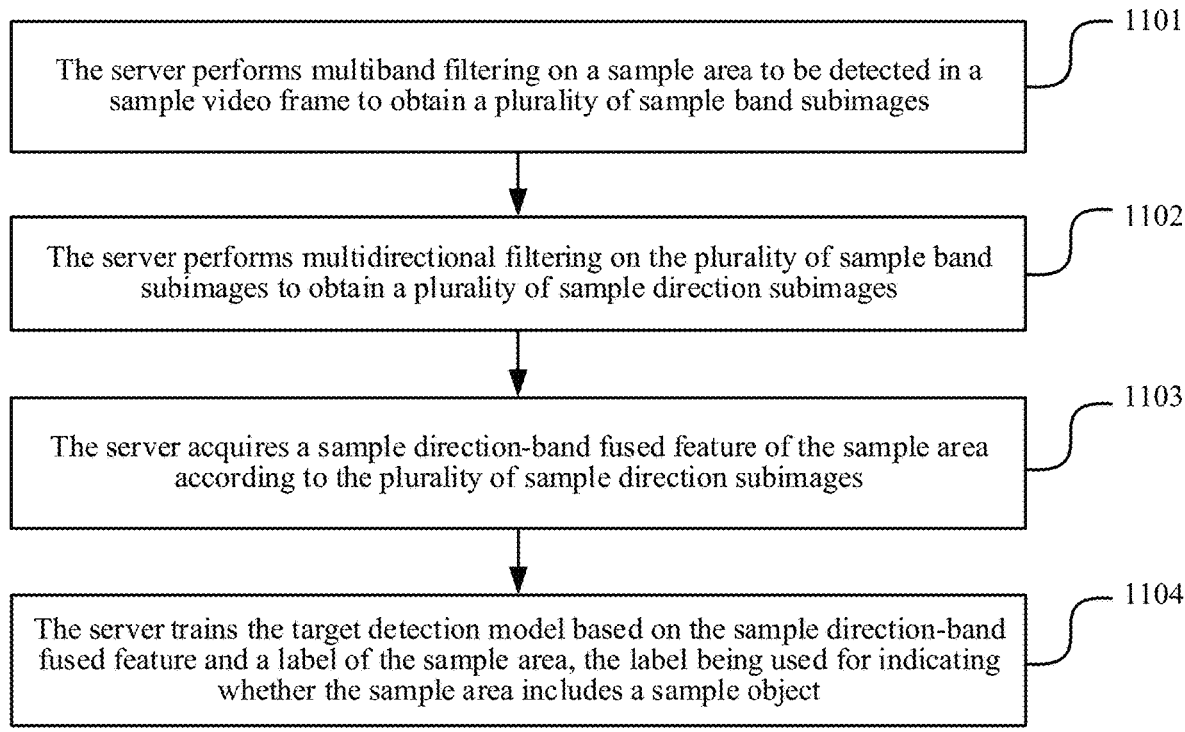
FIG. 11 is a flowchart of a training method of a target detection model according to an embodiment of this disclosure.

For a training method of the target detection model, reference is made to the description for FIG. 11 below.

In a possible implementation, the target detection model includes a plurality of submodels that are independent of each other. The terminal inputs the direction-band fused feature into the target detection model, i.e., inputs the direction-band fused feature respectively into the plurality of submodels. The terminal performs prediction based on the direction-band fused feature through the plurality of submodels, and outputs a plurality of predicted parameters corresponding to the plurality of submodels. The predicted parameters are used for determining the corresponding predicted label. The terminal fuses the plurality of predicted parameters based on confidence levels of the plurality of submodels to obtain the predicted label of the first target area. The confidence level is positively correlated with the prediction accuracy of the corresponding submodel during testing. In some embodiments, the target detection model is also referred to as an Adaboost model.

In this implementation, the terminal can perform prediction separately through the plurality of submodels of the target detection model and fuse the prediction results of plurality of submodels of the target detection model based on the confidence levels of the plurality of submodels to obtain the final predicted label. In this way, the prediction abilities of the plurality of submodels can be utilized to avoid an overall predicted label error caused by the prediction error of a certain submodel, that is, avoid overfitting of the model, thereby improving the prediction ability of the target detection model.

For example, the target detection model includes 3 submodels, each of which is an independently trained submodel. The terminal inputs the direction-band fused feature (1, 2, 3, 4, 2, 3, 4, 5) of the first target area respectively into 3 submodels, and the 3 submodels perform full connection on the direction-band fused feature (1, 2, 3, 4, 2, 3, 4, 5) based on weight matrices $$\begin{pmatrix} 1 & 0 & 0 & 0 & 1 & 0 & 1 & 0 \\ 0 & 0 & 1 & 0 & 0 & 0 & 0 & 1 \end{pmatrix}^T,$$

$$\begin{pmatrix} 1 & 0 & 1 & 0 & 0 & 0 & 1 & 0 \\ 0 & 1 & 0 & 0 & 1 & 0 & 0 & 1 \end{pmatrix}^T \text{ and } \begin{pmatrix} 0 & 1 & 0 & 0 & 1 & 0 & 1 & 0 \\ 1 & 0 & 1 & 0 & 0 & 1 & 0 & 1 \end{pmatrix}^T$$

to obtain 3 predicted parameters (7, 8), (8, 9) and (8, 12) corresponding to the 3 submodels. The terminal normalizes the 3 predicted parameters (7, 8), (8, 9) and (8, 12) through the 3 submodels respectively to obtain 3 probability vectors (0.46, 0.54), (0.47, 0.53) and (0.4, 0.6) corresponding to the 3 submodels. The terminal performs weighted fusion on the 3 probability vectors according to the 3 confidence levels 0.1, 0.2 and 0.7 corresponding to the 3 submodels to obtain a fused probability vector (0.42, 0.58). 0.42 indicates that the probability that the first target area includes the target object is 42%, and 0.58 indicates that the probability that the first target area does not include the target object is 58%. If the terminal uses 0 to indicate a predicted label that the first target area includes the target object and 1 to indicate a predicted label that the first target area does not include the target object, then the terminal can set the predicted label of the first target area as 1.

The above description is made by way of the example of the target detection model being an Adaboost model. In other possible implementations, the target detection model may also be a model of other structures, such as a decision tree model or a convolutional network model, which is not limited in this embodiment of this disclosure.

406: The terminal highlights, in response to the predicted label indicating that the first target area includes the target object, an outline of the first target area in the first video frame.

Figure 9:
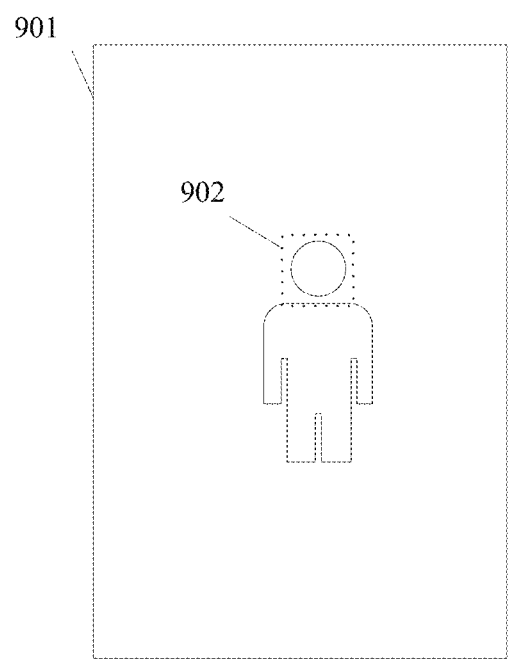
FIG. 9 is a schematic diagram of an interface according to an embodiment of this disclosure.

Referring to FIG. 9, the terminal can display the outline 902 of the first target area in the first video frame 901, so that the technicians can quickly determine the position of the target object in the first video frame 901.

All the foregoing technical solutions may be combined to form one or more embodiments of this disclosure, and details are not described herein again.

The technical solution provided by the embodiments of this disclosure will be further described below with reference to FIG. 10 and each implementation in steps 401-406 above.

Figure 10:
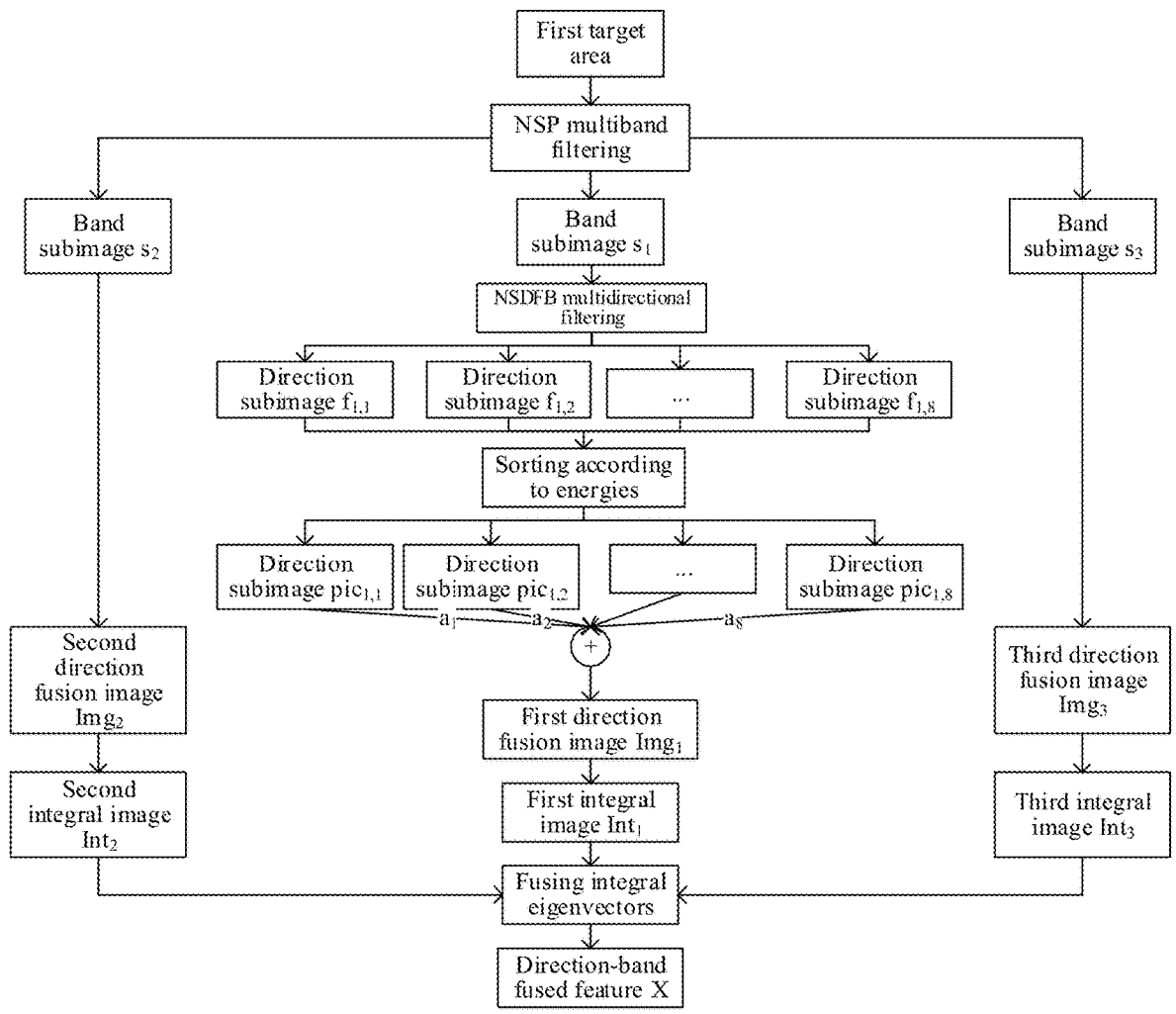
FIG. 10 is a flowchart of a target detection method according to an embodiment of this disclosure.

Referring to FIG. 10, the terminal performs multiband filtering on the first target area in the first video frame through a Non Subsampled Pyramid (NSP) to obtain the plurality of band subimages. The terminal performs multi-directional filtering on any band subimage 51 in the plurality of band subimages through a Non Subsampled DFB (NSDFB) to obtain a plurality of direction subimages $f_{1,j}$ corresponding to the band subimage $S_1$. 1 represents the band subimage $S_1$, and j is the number of the direction subimages. In some embodiments, j=8. The terminal sorts the 8 direction subimages $f_{1,1}$-$f_{1,8}$ according to the energies of the 8 direction subimages to obtain the 8 sorted direction subimages $pic_{1,1}$-$pic_{1,8}$, i.e., 8 reference direction subimages. The terminal acquires 8 fusion weights $a_1$-$a_8$ corresponding to the 8 direction subimages according to the energies of the 8 direction subimages $f_{1,1}$-$f_{1,8}$. The terminal performs weighted fusion on the 8 sorted direction subimages $pic_{1,1}$-$pic_{1,8}$ based on the 8 fusion weights $a_1$-$a_8$ to obtain a first direction fusion image $Img_1$. The terminal integrates the 8 fusion weights $a_1$-$a_8$ into a fusion equivalent filter, so that a plurality of direction subimages of other band image can be quickly fused into a corresponding second direction fusion image through the fusion equivalent filter, and a plurality of direction subimages corresponding to a plurality of other band images can be fused into a plurality of second direction fusion images through the equivalent filter. In some embodiments, if the number of the plurality of band subimages is 3, then the terminal can integrate the 8 fusion weights $a_1$-$a_8$ into a fusion equivalent filter $hc_2$ and a fusion equivalent filter $hc_3$. The terminal processes the other two band subimages through the fusion equivalent filter $hc_2$ and the fusion equivalent filter $hc_3$ to obtain a second direction fusion image $Img_2$ and a third direction fusion image $Img_3$ corresponding to the other two band subimages. The terminal acquires a first integral image $Int_1$ of the first direction fusion image $Img_1$, a second integral image $Int_2$ of the second direction fusion image $Img_2$ and a third integral image $Int_3$ of the third direction fusion image $Img_3$. The terminal splices a first integral eigenvector of the first integral image $Int_1$, a second integral eigenvector of the second integral image $Int_2$ and a third integral eigenvector of the third integral image $Int_3$ to obtain a direction-band fused feature X of the first target area. The terminal can input the direction-band fused feature X into the target detection model and output the predicted label of the first target area through the target detection model. When the predicted label indicates that the first target area includes the target object, the terminal highlights the outline of the first target area in the first video frame.

The technical solution according to the embodiments of this disclosure has good effects in identifying game tasks and tracking trajectories. When the game character is rotating or being occluded, the technical solution can correctly identify the position of the game character, so that the numerical analysis efficiency of the game character is optimized greatly. The success rate of identification is 99% in a card game, and 95% or more even in a MOBA game.

By the aid of the technical solution according to this embodiment of this disclosure, the terminal can perform band filtering and directional filtering on the first target area in the first video frame to obtain the plurality of band subimages indicating band information of the first target area and the plurality of direction subimages indicating direction information of the first target area. The direction-band fused feature obtained by the terminal fusing the band information and the direction information can indicate features of the first target area more completely. Even if the target object moves slowly or rotates, the direction-band fused information can accurately indicate the features of the first target area. Subsequently, when the terminal performs target detection based on the direction-band fused feature through the target detection model, more accurate detection effects can be obtained.

Besides, since the terminal uses the non subsampled pyramid filter in the process of filtering the first target area and there is no subsampling process for the non subsampled pyramid filter, the outputted band subimage has the same size as the first target area. In this way, the process of image enlargement and image registration after the subsampling is eliminated, thereby improving the accuracy of subsequent target detection.

Moreover, when performing the multidirectional filtering on the band subimage, the terminal also uses the non subsampled filter, which avoids image mismatch caused by scale transform during directional filtering, and improves the accuracy of subsequent target detection.

In addition, the terminal can acquire the direction-band fused feature of the first target area by acquiring and sorting the plurality of direction subimages corresponding to any band subimage in the plurality of band subimages instead of processing band features one by one, thereby reducing the computational complexity of the terminal.

More importantly, the terminal can highlight the outline of the first target area when determining that the first target area includes the target object in the first video frame, so that the technicians can find the position of the target object in time, which improves the human-machine interaction efficiency.

After introducing the target detection method according to this embodiment of this disclosure, a training method of the target detection model according to this embodiment of this disclosure will be described by steps 1101-1104. In this embodiment of this disclosure, the target detection model may be trained by both the terminal and the server. Taking the target detection model being trained by the server as an example, referring to FIG. 11, the method includes:

1101: The server performs multiband filtering on a sample area to be detected in a sample video frame to obtain a plurality of sample band subimages.

The server may capture video images from different videos. The technicians may screen the video images captured by the server, and select the video image including the target object as the sample video frame. While screening the video images, the technicians may also add labels to the video images. The label is used for indicating whether the corresponding area in the sample video frame includes the target object. Subsequently, the server can train the target detection model under the supervision of the labels.

In a possible implementation, the terminal inputs the sample area into a band filter bank, and performs multiband filtering on the sample area through a plurality of band filters in the band filter bank to obtain the plurality of band subimages. The band filters are non subsampled pyramid filters.

This implementation is analogous to the corresponding implementation in step 402 above. For this implementation, reference can be made to relevant description of step 402, which will be not repeated here.

1102: The server performs multidirectional filtering on the plurality of sample band subimages to obtain a plurality of sample direction subimages.

In a possible implementation, for each sample band subimage, the terminal inputs the sample band subimage into a directional filter bank, and performs multidirectional filtering on the sample band subimage through a plurality of directional filters in the directional filter bank to obtain a plurality of direction features corresponding to the sample band subimage. The terminal inputs the direction features into a corresponding reconstruction filter in the directional filter bank, and generates a plurality of direction subimages of the sample band subimage based on the inputted direction features through the reconstruction filter. The directional filters and the reconstruction filter are all non subsampled filters.

This implementation is analogous to the corresponding implementation in step 403 above. For this implementation, reference can be made to relevant description of step 403, which will be not repeated here.

1103: The server acquires a sample direction-band fused feature of the sample area according to the plurality of sample direction subimages.

In a possible implementation, the terminal acquires energies of a plurality of sample direction subimages corresponding to any sample band subimage in the plurality of sample band subimages. The terminal sorts the plurality of sample direction subimages corresponding to the sample band subimage in descending order of energies. The terminal acquires the sample direction-band fused feature of the sample area based on the plurality of sorted sample direction subimages corresponding to the sample band subimage and a plurality of sample direction subimages corresponding to other sample band subimages in the plurality of sample band subimages.

This implementation is analogous to the corresponding implementation in step 404 above. For this implementation, reference can be made to relevant description of step 404, which will be not repeated here.

1104: The server trains the target detection model based on the sample direction-band fused feature and a label of the sample area, the label being used for indicating whether the sample area includes a sample object.

In a possible implementation, the server inputs the sample direction-band fused feature into the target detection model, and performs prediction based on the sample direction-band fused feature through the target detection model to output a predicted label of the sample area. The server updates model parameters of the target detection model based on difference information between the predicted label and the label of the sample area.

The following description takes the target detection model being an Adaboost model as an example.

The Adaboost model includes a plurality of submodels Classifier$_t$. t is the number of submodels. For the first submodel Classifier$_1$, the server inputs a sample direction-band fused feature $t_1$ into the first submodel Classifier$_1$, and the first submodel Classifier$_1$ performs full connection and normalization on the sample direction-band fused feature $t_1$ to output a predicted sample label of the sample area. The predicted sample label is used for indicating whether the sample area includes the sample object. The server constructs a loss function indicating the difference between the predicted sample label and the label of the sample area to update model parameters of the first submodel Classifier$_1$.

Besides, if the predicted sample label predicted by the first submodel Classifier$_1$ based on the sample direction-band fused feature $t_1$ is the same as the label corresponding to the sample area, it indicates a lower difficulty in prediction of the sample direction-band fused feature $t_1$, and then the server can reduce a training weight $w_1$ of the sample direction-band fused feature $t_1$. If the predicted sample label predicted by the first submodel Classifier$_1$ based on the sample direction-band fused feature $t_1$ is different from the label corresponding to the sample area, it indicates a higher difficulty in prediction of the sample direction-band fused feature $t_1$, and then the server can increase the training weight $w_1$ of the sample direction-band fused feature $t_1$. The training weight determines the update extent of the model parameters by the sample direction-band fused feature. The larger the training weight, the update extent of the model parameters.

After setting the training weight for the sample direction-band fused feature, the server can acquire another sample video frame and execute steps 1101-1103 above on the another sample video frame to obtain a sample direction-band fused feature $t_2$ of the another sample video frame. The server initializes a second submodel Classifier$_2$ and trains the second submodel Classifier$_2$ based on prediction of the sample direction-band fused feature $t_1$, the training weight $w_1$ corresponding to prediction of the sample direction-band fused feature $t_1$ and the sample direction-band fused feature $t_2$, and so on. In this process, the submodel to be trained uses the training sample that has been used by the previously trained submodel and that has the sample direction-band fused feature with the corresponding training weight, so that the target detection model's ability to identify indistinguishable areas can be improved.

After training the t submodels of the target detection model, the server may test the t submodels through the same test suites and respectively record accuracies of the t submodels in the testing process. The server sets corresponding confidence levels for the t submodels according to the accuracies of the t submodels in the testing process, and thus, is capable of predicting the labels based on the corresponding confidence levels of the t submodels in the subsequent prediction process using the target detection model.

The above description is made by way of the example of the model being trained by the server. In other possible implementations, the above target detection model may also be trained by the terminal, or through interaction between the terminal and the server. For example, the terminal collects training images of the target detection model and sends the training images of the target detection model to the server, and then the server trains the target detection model.

The technical solution according to this embodiment of this disclosure will be described in conjunction with FIG. 12 and various possible implementations in steps 401-406 and steps 1101-1104 above.

Figure 12:
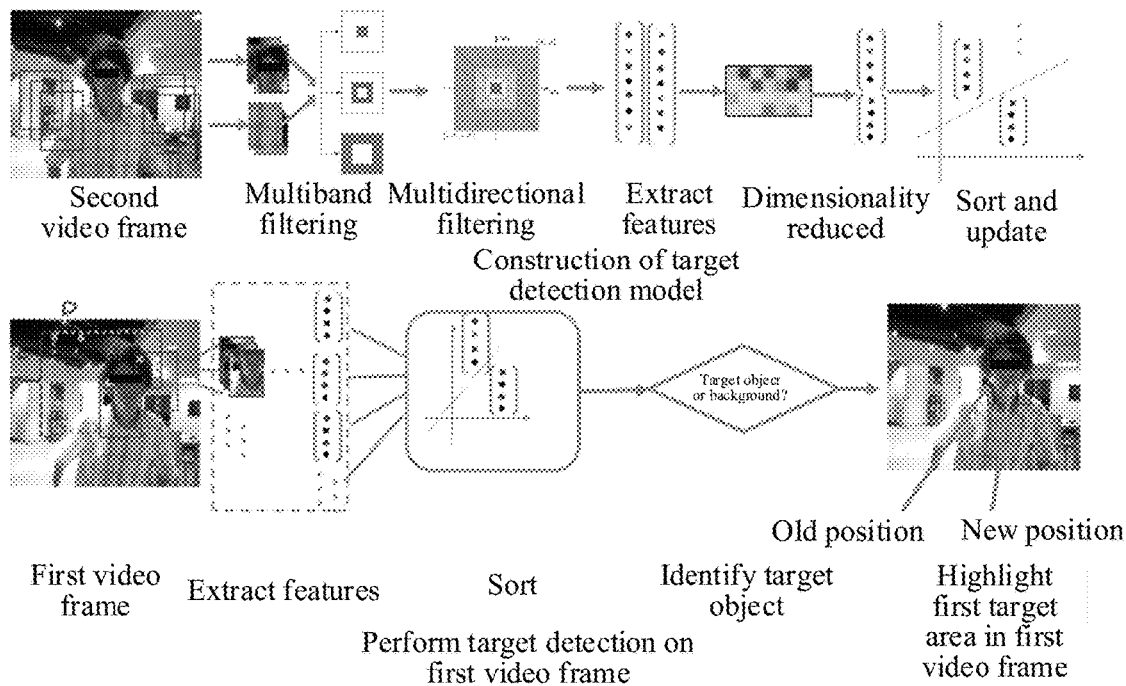
FIG. 12 is a flowchart of a target detection method according to an embodiment of this disclosure.

Referring to FIG. 12, the upper part shows a flowchart of training the target detection model, corresponding to steps 1101-1104. The server collects a plurality of sample areas in a sample video frame. The plurality of sample areas include a positive sample area (area including the sample object) and a negative sample area (background area). Taking one sample area in the sample video frame as an example, the server performs multiband filtering on the sample area of the sample video frame through a Non Subsampled Pyramid (NKP) to obtain a plurality of sample band subimages. The server performs multidirectional filtering on any sample band subimage $k_1$ in the plurality of sample band subimages through Non Subsampled Directional Filter Banks (NSDFB) to obtain a plurality of sample direction subimages $m_{1,j}$ corresponding to the sample band subimage $k_1$. 1 represents the sample band subimage $k_1$, and j is the number of the sample direction subimages. In some embodiments, j=8. The server sorts the 8 sample direction subimages $m_{1,1}$-$m_{1,8}$ according to energies of the 8 sample direction subimages $m_{1,1}$-$m_{1,8}$ to obtain 8 sorted sample direction subimages $pic_{1,1}$-$pic_{1,8}$. The server acquires 8 fusion weights $a_1$-$a_8$ corresponding to the 8 sample direction subimages according to the energies of the 8 sample direction subimages $m_{1,1}$-$m_{1,8}$. The server performs weighted fusion on the 8 sorted sample direction subimages $pic_{1,1}$-$pic_{1,8}$ based on the 8 fusion weights $a_1$-$a_8$ to obtain a first sample direction fusion image $SImg_1$. The server integrates the 8 fusion weights $a_1$-$a_8$ into a fusion equivalent filter, so that a plurality of sample direction subimages of other band image can be quickly fused into a corresponding second sample direction fusion image through the fusion equivalent filter, and a plurality of sample direction subimages corresponding to a plurality of other band images can be fused into a plurality of second sample direction fusion images through the equivalent filter. In some embodiments, if the number of the plurality of sample band subimages is 3, then the server can integrate the 8 fusion weights $a_1$-$a_8$ into a fusion equivalent filter $hc_2$ and a fusion equivalent filter $hc_3$. The server processes the other two sample band subimages through the fusion equivalent filter $hc_2$ and the fusion equivalent filter $hc_3$ to obtain a second sample direction fusion image $SImg_2$ and a third sample direction fusion image $SImg_3$ corresponding to the other two sample band subimages. The server acquires a first sample integral image $SInt_1$ of the first sample direction fusion image $SImg_1$, a second sample integral image $SInt_2$ of the second sample direction fusion image $SImg_2$ and a third sample integral image $SInt_3$ of the third sample direction fusion image $SImg_3$. The server splices a first sample integral eigenvector of the first sample integral image $SInt_1$ a second sample integral eigenvector of the second sample integral image $SInt_2$ and a third sample integral eigenvector of the third sample integral image $SInt_3$ to obtain a sample direction-band fused feature Y of the sample area. The server can input the sample direction-band fused feature Y into the target detection model and output the predicted label of the sample area through the target detection model. The server trains the target detection model based on difference information between the predicted label and the label of the sample area. For the training process, reference can be made to the description of step 1104, which will not be repeated here.

The lower part of FIG. 12 shows a flowchart of performing target detection using the target detection model, corresponding to steps 401-406. For the description of this process, reference can be made to the description for FIG. 10, which will not be repeated here. In FIG. 12, the old position refers to the position of the target object in the second video frame, and the new position refers to the position of the target object in the first video frame.

Figure 13:
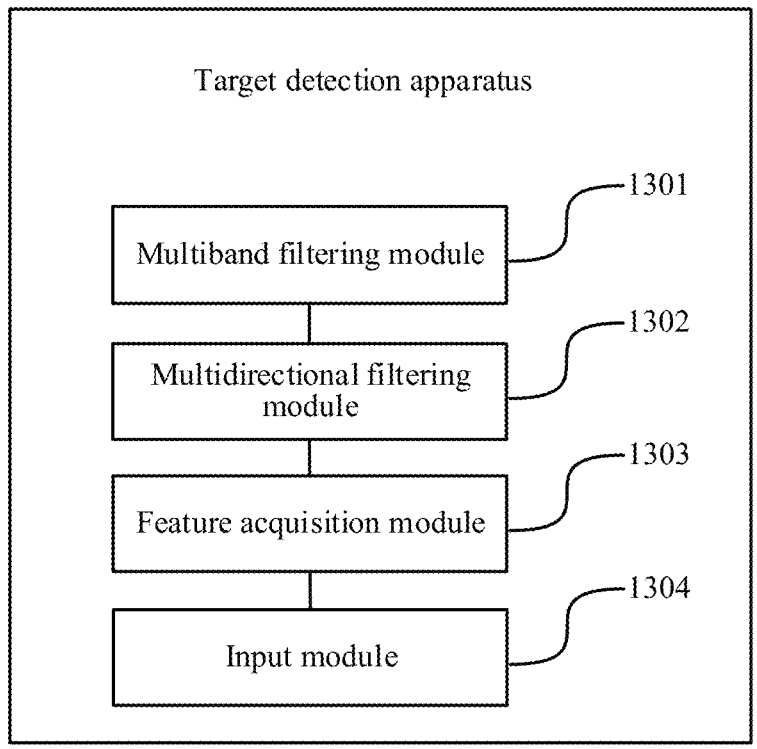
FIG. 13 is a schematic structural diagram of a target detection apparatus according to an embodiment of this disclosure.

FIG. 13 is a schematic structural diagram of a target detection apparatus according to an embodiment of this disclosure. Referring to FIG. 13, the apparatus includes: a multiband filtering module 1301, a multidirectional filtering module 1302, a feature acquisition module 1303 and an input module 1304.

The multiband filtering module 1301 is configured to perform multiband filtering on a first target area to obtain a plurality of band subimages. The first target area is an area to be detected in a first video frame.

The multidirectional filtering module 1302 is configured to perform multidirectional filtering on the plurality of band subimages to obtain a plurality of direction subimages.

The feature acquisition module 1303 is configured to acquire a direction-band fused feature of the first target area according to the plurality of direction subimages.

The input module 1304 is configured to input the direction-band fused feature into a target detection model, and perform prediction based on the direction-band fused feature through the target detection model to obtain a predicted label of the first target area. The predicted label is used for indicating whether the first target area includes a target object.

In a possible implementation, the multiband filtering module 1301 is configured to input the first target area into a band filter bank, and perform the multiband filtering on the first target area through a plurality of band filters in the band filter bank to obtain the plurality of band subimages.

In a possible implementation, the multidirectional filtering module 1302 is configured to, for any band subimage in the plurality of band subimages, input the band subimage into a directional filter bank, and perform the multidirectional filtering on the band subimage through a plurality of directional filters in the directional filter bank to obtain a plurality of direction features corresponding to the band subimage; and input the direction features into a corresponding reconstruction filter in the directional filter bank, and generate a plurality of direction subimages of the band subimage based on the inputted direction features through the reconstruction filter.

In a possible implementation, the feature acquisition module 1303 is configured to acquire energies of a plurality of first direction subimages corresponding to any band subimage in the plurality of band subimages; sort the plurality of first direction subimages in descending order of energies to obtain a plurality of reference direction subimages; and acquire the direction-band fused feature of the first target area based on the plurality of reference direction subimages and a plurality of second direction subimages, the second direction subimages being direction subimages corresponding to other band subimages in the plurality of band subimages.

In a possible implementation, the feature acquisition module 1303 is configured to perform weighted fusion on the plurality of reference direction subimages based on a plurality of fusion weights corresponding to the plurality of reference direction subimages to obtain a first direction fusion image corresponding to the band subimage, the fusion weight being positively correlated with the energy of the corresponding first direction subimage; fuse the plurality of second direction subimages respectively based on the plurality of fusion weights to obtain a plurality of second direction fusion images corresponding to the other band subimages; and acquire the direction-band fused feature based on the first direction fusion image and the plurality of second direction fusion images.

In a possible implementation, the feature acquisition module 1303 is configured to acquire a first integral image corresponding to the first direction fusion image; acquire a plurality of second integral images corresponding to the plurality of second direction fusion images; and splice a first integral eigenvector with a plurality of second integral eigenvectors to obtain the direction-band fused feature of the first target area, the first integral eigenvector being an integral eigenvector corresponding to the first integral image, and the second integral eigenvectors being eigenvectors corresponding to the second integral images.

In a possible implementation, the apparatus further includes:

a first target area determination module, configured to determine a second target area, the second target area being an area where the target object is located in a second video frame, and the second video frame being a video frame with a display time earlier than the first video frame; and offset the second target area based on the first video frame and the second video frame to obtain the first target area, the first target area being an area corresponding to the offset second target area in the first video frame.

In a possible implementation, the apparatus further includes:

a display module, configured to highlight, in response to the predicted label indicating that the first target area includes the target object, an outline of the first target area in the first video frame.

In a possible implementation, a training apparatus of the target detection model is configured to perform multiband filtering on a sample area to be detected in a sample video frame to obtain a plurality of sample band subimages; perform multidirectional filtering on the plurality of sample band subimages to obtain a plurality of sample direction subimages; acquire a sample direction-band fused feature of the sample area according to the plurality of sample direction subimages; and train the target detection model based on the sample direction-band fused feature and a label of the sample area, the label being used for indicating whether the sample area includes a sample object.

In a possible implementation, the training apparatus of the target detection model is configured to input the sample direction-band fused feature into the target detection model, and perform prediction based on the sample direction-band fused feature through the target detection model to output a predicted label of the sample area; and update model parameters of the target detection model based on difference information between the predicted label and the label of the sample area.

By the aid of the technical solution according to this embodiment of this disclosure, the terminal can perform band filtering and directional filtering on the first target area in the first video frame to obtain the plurality of band subimages indicating band information of the first target area and the plurality of direction subimages indicating direction information of the first target area. The direction-band fused feature obtained by the terminal fusing the band information and the direction information can indicate features of the first target area more completely. Even if the target object moves slowly or rotates, the direction-band fused information can accurately indicate the features of the first target area. Subsequently, when the terminal performs target detection based on the direction-band fused feature through the target detection model, more accurate detection effects can be obtained.

Figure 14:
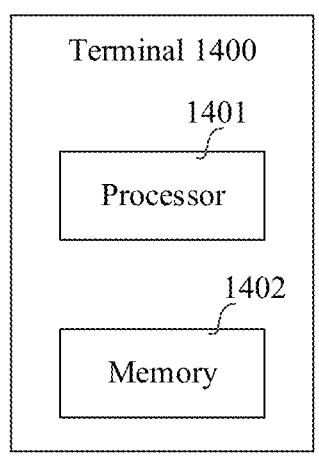
FIG. 14 is a schematic structural diagram of a terminal according to an embodiment of this disclosure.

An embodiment of this disclosure provides a computer device, configured to perform the foregoing method, the computer device may be implemented as a terminal or a server, and a structure of the terminal is first described below:

FIG. 14 is a schematic structural diagram of a terminal according to an embodiment of this disclosure. The terminal 1400 may be: a smartphone, a tablet computer, a notebook computer, or a desktop computer. The terminal 1400 may also be referred to by other names as user equipment, a portable terminal, a laptop terminal, a desktop terminal, etc.

Generally, the terminal 1400 includes: one or more processors 1401 (including processing circuitry) and one or more memories 1402 (including a non-transitory computer-readable storage medium).

The processor 1401 may include one or more processing cores, such as a 4-core processor or an 8-core processor. The processor 1401 may be implemented by using at least one hardware form of a digital signal processor (DSP), a field-programmable gate array (FPGA), and a programmable logic array (PLA). The processor 1401 may alternatively include a main processor and a coprocessor. The main processor is configured to process data in an active state, also referred to as a CPU. The coprocessor is a low-power consumption processor configured to process data in a standby state. In some embodiments, the processor 1401 may be integrated with a graphics processing unit (GPU). The GPU is configured to be responsible for rendering and drawing content that a display needs to display. In some embodiments, the processor 1401 may further include an artificial intelligence (AI) processor. The AI processor is configured to process computing operations related to machine learning.

The memory 1402 may include one or more computer-readable storage media. The computer-readable storage media may be non-transitory. The memory 1402 may further include a high-speed random access memory, as well as non-volatile memory, such as one or more disk storage devices and flash storage devices. In some embodiments, the non-transitory computer-readable storage medium in the memory 1402 is configured to store at least one computer program, and the at least one computer program is configured to be executed by the processor 1401 to implement the target detection method provided in the method embodiments of this disclosure.

A person skilled in the art can understand that the structure shown in FIG. 14 does not constitute a limitation to the terminal 1400, and the terminal may include more or fewer components than those shown in the figure, or some components may be combined, or a different component arrangement may be used.

Figure 15:
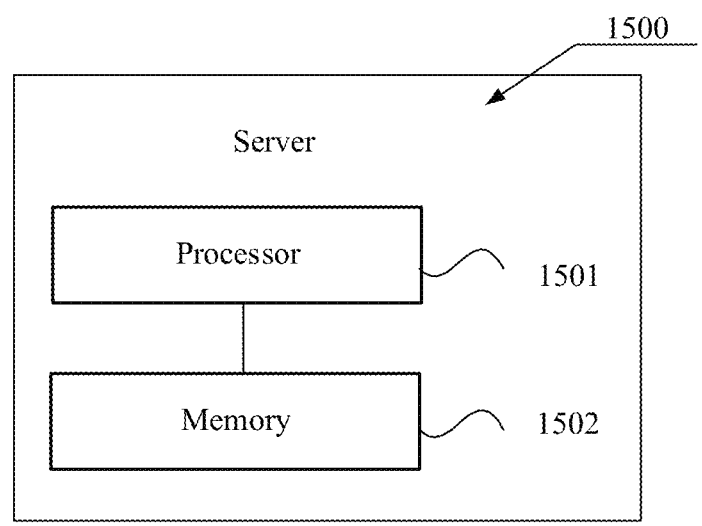
FIG. 15 is a schematic structural diagram of a server according to an embodiment of this disclosure.

The above computer device may also be realized as a server. The structure of the server will be described below:

FIG. 15 is a schematic structural diagram of a server according to an embodiment of this disclosure. The server 1500 may vary greatly because a configuration or performance varies, and may include one or more central processing units (CPU) 1501 and one or more memories 1502. The one or more memories 1502 store at least one computer program, and the at least one computer program is loaded and executed by the one or more processors 1501 to implement the methods provided in the foregoing various method embodiments. Certainly, the server 1500 may also have a wired or wireless network interface, a keyboard, an input/output interface and other components to facilitate input/output. The server 1500 may also include other components for implementing device functions. Details are not described herein.

In an exemplary embodiment, a computer-readable storage medium, for example, a memory including one computer program is further provided. The computer program may be executed by a processor in a terminal to implement the target detection method in the foregoing embodiments. For example, the computer-readable storage medium may be a read-only memory (ROM), a random access memory (random-access memory, RAM), a compact disc read-only memory (CD-ROM), a magnetic tape, a floppy disk, an optical data storage device, and the like.

In an exemplary embodiment, a computer program product or a computer program is further provided, including program code, the program code being stored in a computer-readable storage medium, a processor of a computer device reading the program code from the computer-readable storage medium, and executing the program code, to cause the computer device to implement the target detection method provided in the foregoing implementations.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A detection method, comprising:
   performing multiband filtering on a first area to obtain a plurality of band sub-images, the first area being an area in a first video frame;
   performing multidirectional filtering on the plurality of band sub-images to obtain a plurality of direction sub-images;
   acquiring a direction-band fused feature of the first area according to the plurality of direction sub-images, wherein the direction-band fused feature fuses direction information and frequency information of the plurality of direction sub-images of each of the plurality of band sub-images, wherein the direction information is sorted prior to fusion based on associated energies for each of the direction sub-images;
   inputting the direction-band fused feature into a detection model; and
   performing detection based on the direction-band fused feature using the detection model to detect whether the first area comprises an object.

2. The method according to claim 1, wherein the performing the multiband filtering comprises:
   inputting the first area into a band filter bank, and performing the multiband filtering on the first area through a plurality of band filters in the band filter bank to obtain the plurality of band sub-images.

3. The method according to claim 1, wherein the performing the multidirectional filtering comprises:
   inputting, for each band sub-image in the plurality of band sub-images, the respective band sub-image into a directional filter bank, and performing the multidirectional filtering on the respective band sub-image through a plurality of directional filters in the directional filter bank to obtain a plurality of direction features associated with the direction information and corresponding to the respective band sub-image; and
   inputting the direction features into a corresponding reconstruction filter in the directional filter bank, and generating a plurality of direction sub-images of the respective band sub-image based on the inputted direction features through the reconstruction filter.

4. The method according to claim 1, wherein the acquiring comprises:
   acquiring energies of a plurality of first direction sub-images corresponding to one band sub-image in the plurality of band sub-images;
   sorting the plurality of first direction sub-images in descending order of energies to obtain a plurality of reference direction sub-images; and
   acquiring the direction-band fused feature of the first area based on the plurality of reference direction sub-images and a plurality of second direction sub-images, the second direction sub-images being direction sub-images corresponding to other band sub-images in the plurality of band sub-images other than the one band sub-image.

5. The method according to claim 4, wherein the acquiring the direction-band fused feature of the first area based on the plurality of reference direction sub-images and the plurality of second direction sub-images comprises:
   performing weighted fusion on the plurality of reference direction sub-images based on a plurality of fusion weights corresponding to the plurality of reference direction sub-images to obtain a first direction fusion image corresponding to the one band sub-image, the fusion weights being positively correlated with energies of corresponding first direction sub-images;
   fusing the plurality of second direction sub-images respectively based on the plurality of fusion weights to obtain a plurality of second direction fusion images corresponding to the other band sub-images; and
   acquiring the direction-band fused feature based on the first direction fusion image and the plurality of second direction fusion images.

6. The method according to claim 5, wherein the acquiring the direction-band fused feature based on the first direction fusion image and the plurality of second direction fusion images comprises:
   acquiring a first integral image corresponding to the first direction fusion image;
   acquiring a plurality of second integral images corresponding to the plurality of second direction fusion images; and
   splicing a first integral eigenvector with a plurality of second integral eigenvectors to obtain the direction-band fused feature of the first area, the first integral eigenvector being an integral eigenvector corresponding to the first integral image, and the second integral eigenvectors being eigenvectors corresponding respectively to the second integral images.

7. The method according to claim 1, wherein before the performing the multiband filtering, the method further comprises:
   determining a second area, the second area being an area where the object is located in a second video frame, and the second video frame being a video frame with a display time earlier than the first video frame; and
   offsetting the second area based on the first video frame and the second video frame to obtain the first area, the first area being an area corresponding to the offset second area in the first video frame.

8. The method according to claim 1, wherein after the performing the detection, the method further comprises:
   highlighting, in response to a determination that the first area comprises the object, an outline of the first area in the first video frame.

9. The method according to claim 1, wherein a training method of the detection model comprises:
   performing the multiband filtering on a sample area in a sample video frame to obtain a plurality of sample band sub-images;

performing the multidirectional filtering on the plurality of sample band sub-images to obtain a plurality of sample direction sub-images;

acquiring a sample direction-band fused feature of the sample area according to the plurality of sample direction sub-images; and training the detection model based on the sample direction-band fused feature and a label of the sample area, the label indicating whether the sample area comprises a sample object.

10. The method according to claim 9, wherein the training comprises:

inputting the sample direction-band fused feature into the detection model, and performing detection based on the sample direction-band fused feature through the detection model to output a predicted label of the sample area; and updating model parameters of the detection model based on difference information between the predicted label and the label of the sample area.

11. A detection apparatus, the apparatus comprising:

processing circuitry configured to perform multiband filtering on a first area to obtain a plurality of band sub-images, the first area being an area in a first video frame;

perform multidirectional filtering on the plurality of band sub-images to obtain a plurality of direction sub-images;

acquire a direction-band fused feature of the first area according to the plurality of direction sub-images, wherein the direction-band fused feature fuses direction information and frequency information of the plurality of direction sub-images of each of the plurality of band sub-images, wherein the direction information is sorted prior to fusion based on associated energies for each of the direction sub-images;

input the direction-band fused feature into a detection model; and perform detection based on the direction-band fused feature using the detection model to detect whether the first area comprises an object.

12. The apparatus according to claim 11, wherein the processing circuitry is configured to input the first area into a band filter bank, and perform the multiband filtering on the first area through a plurality of band filters in the band filter bank to obtain the plurality of band sub-images.

13. The apparatus according to claim 11, wherein the processing circuitry is further configured to:

input, for each band sub-image in the plurality of band sub-images, the respective band sub-image into a directional filter bank, and perform the multidirectional filtering on the respective band sub-image through a plurality of directional filters in the directional filter bank to obtain a plurality of direction features associated with the direction information and corresponding to the respective band sub-image; and input the direction features into a corresponding reconstruction filter in the directional filter bank, and generate a plurality of direction sub-images of the respective band sub-image based on the inputted direction features through the reconstruction filter.

14. The apparatus according to claim 11, wherein the processing circuitry is further configured to:

acquire energies of a plurality of first direction sub-images corresponding to one band sub-image in the plurality of band sub-images;

sort the plurality of first direction sub-images in descending order of energies to obtain a plurality of reference direction sub-images; and acquire the direction-band fused feature of the first area based on the plurality of reference direction sub-images and a plurality of second direction sub-images, the second direction sub-images being direction sub-images corresponding to other band sub-images in the plurality of band sub-images other than the one band sub-image.

15. The apparatus according to claim 14, wherein the processing circuitry is further configured to:

perform weighted fusion on the plurality of reference direction sub-images based on a plurality of fusion weights corresponding to the plurality of reference direction sub-images to obtain a first direction fusion image corresponding to the one band sub-image, the fusion weights being positively correlated with the energies of the corresponding first direction sub-images;

fuse the plurality of second direction sub-images respectively based on the plurality of fusion weights to obtain a plurality of second direction fusion images corresponding to the other band sub-images; and acquire the direction-band fused feature based on the first direction fusion image and the plurality of second direction fusion images.

16. The apparatus according to claim 15, wherein the processing circuitry is further configured to:

acquire a first integral image corresponding to the first direction fusion image;

acquire a plurality of second integral images corresponding to the plurality of second direction fusion images; and splice a first integral eigenvector with a plurality of second integral eigenvectors to obtain the direction-band fused feature of the first area, the first integral eigenvector being an integral eigenvector corresponding to the first integral image, and the second integral eigenvectors being eigenvectors corresponding respectively to the second integral images.

17. The apparatus according to claim 11, wherein the processing circuitry is further configured to:

before performing the multiband filtering, determine a second area, the second area being an area where the object is located in a second video frame, and the second video frame being a video frame with a display time earlier than the first video frame; and offset the second area based on the first video frame and the second video frame to obtain the first area, the first area being an area corresponding to the offset second area in the first video frame.

18. The apparatus according to claim 11, wherein the processing circuitry is further configured to:

after performing the detection, highlight, in response to a determination that the first area comprises the object, an outline of the first area in the first video frame.

19. The apparatus according to claim 11, wherein the processing circuitry is further configured to perform a training method of the detection model including:

performing the multiband filtering on a sample area in a sample video frame to obtain a plurality of sample band sub-images;

performing the multidirectional filtering on the plurality of sample band sub-images to obtain a plurality of sample direction sub-images;

acquiring a sample direction-band fused feature of the sample area according to the plurality of sample direction sub-images; and training the detection model based on the sample direction-band fused feature and a label of the sample area, the label indicating whether the sample area comprises a sample object.

20. A non-transitory computer-readable storage medium storing computer-readable instructions thereon, which, when executed by a computer device, cause the computer device to perform a detection method comprising:

performing multiband filtering on a first area to obtain a plurality of band sub-images, the first area being an area in a first video frame;

performing multidirectional filtering on the plurality of band sub-images to obtain a plurality of direction sub-images;

acquiring a direction-band fused feature of the first area according to the plurality of direction sub-images, wherein the direction-band fused feature fuses direction information and frequency information of the plurality of direction sub-images of each of the plurality of band sub-images, wherein the direction information is sorted prior to fusion based on associated energies for each of the direction sub-images;

inputting the direction-band fused feature into a detection model; and performing detection based on the direction-band fused feature using the detection model to detect whether the first area comprises an object.

* * * * *